M. CHRISTENSEN.
BOOK STITCHING MACHINE.
APPLICATION FILED JUNE 6, 1914.
1,165,749.
Patented Dec. 28, 1915.
12 SHEETS—SHEET 5.
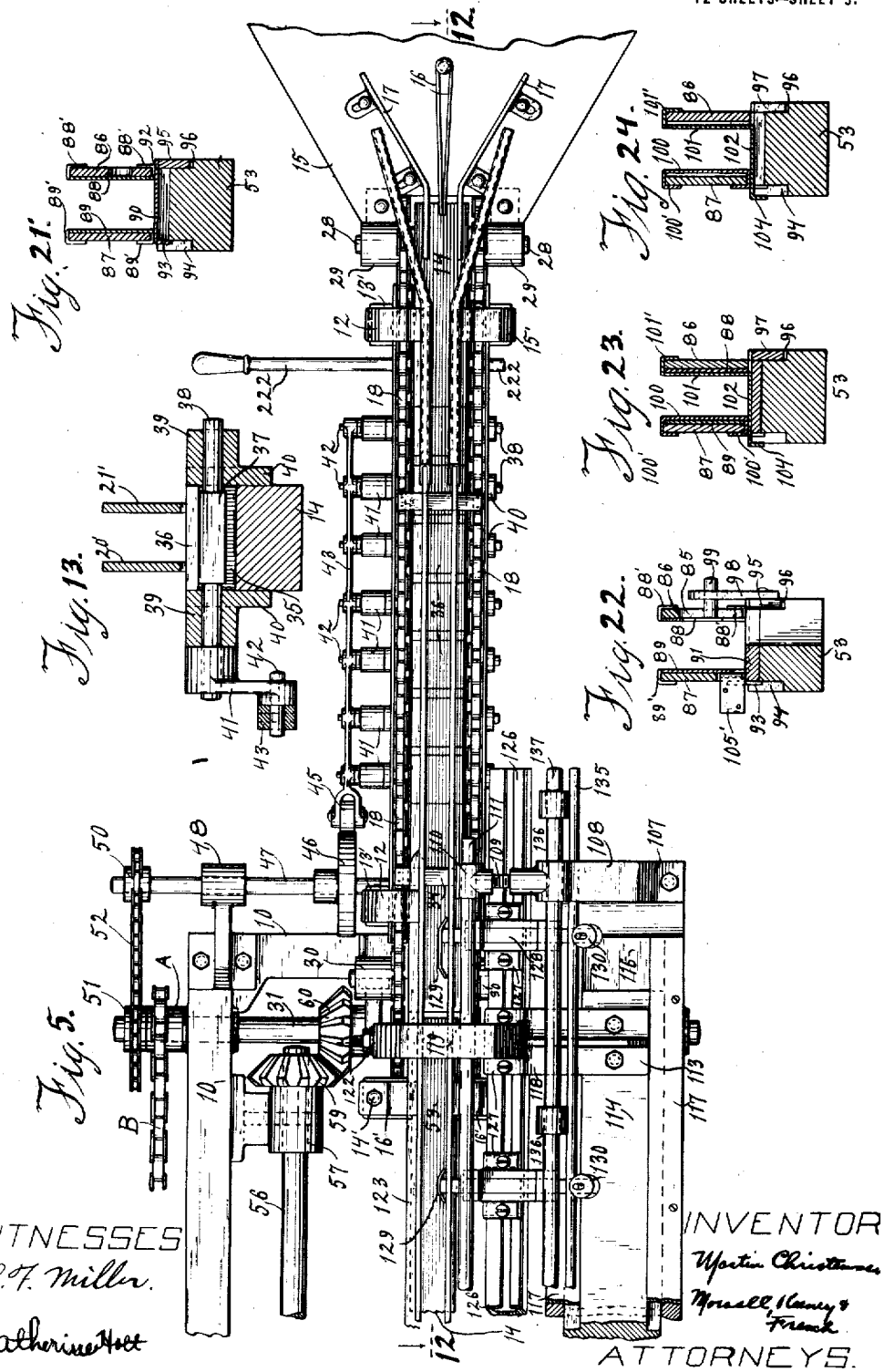
WITNESSES
G. F. Miller.
Katherine Holt.
INVENTOR
Martin Christensen
Morsell, Kenney &
Frank
ATTORNEYS.

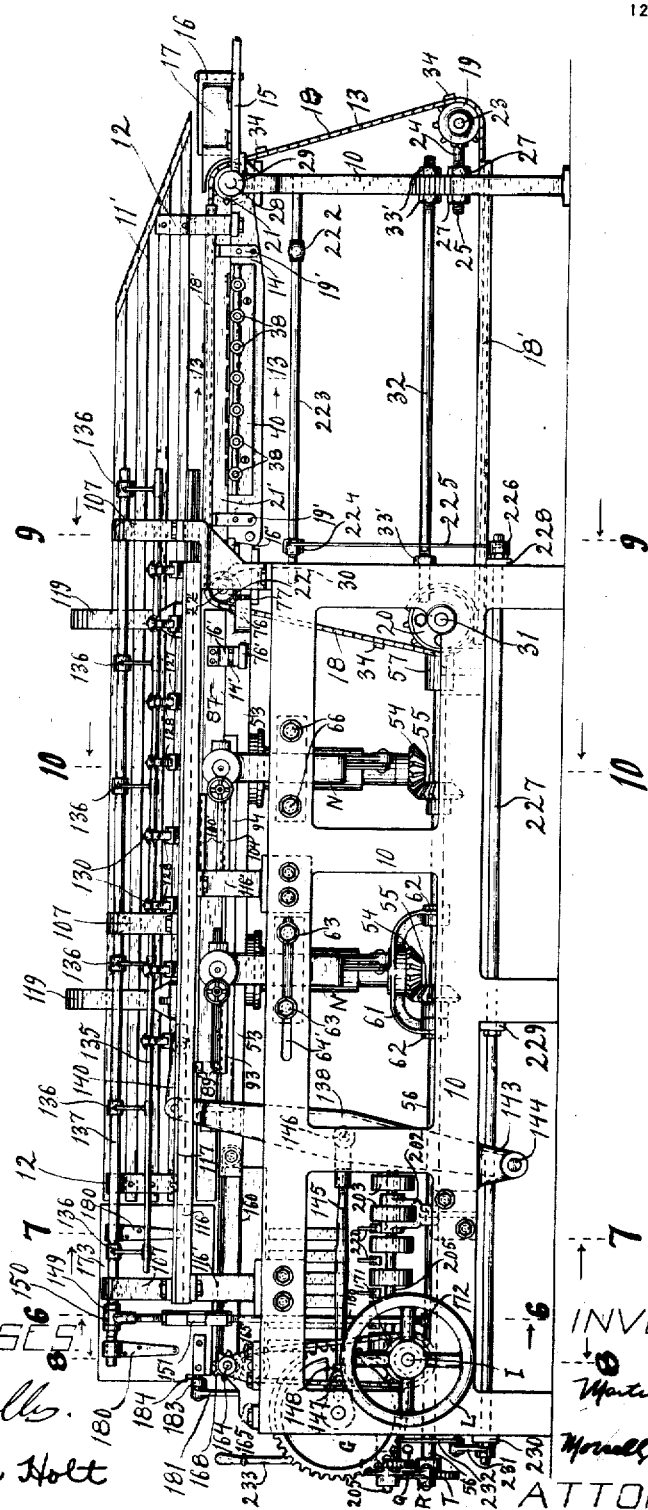

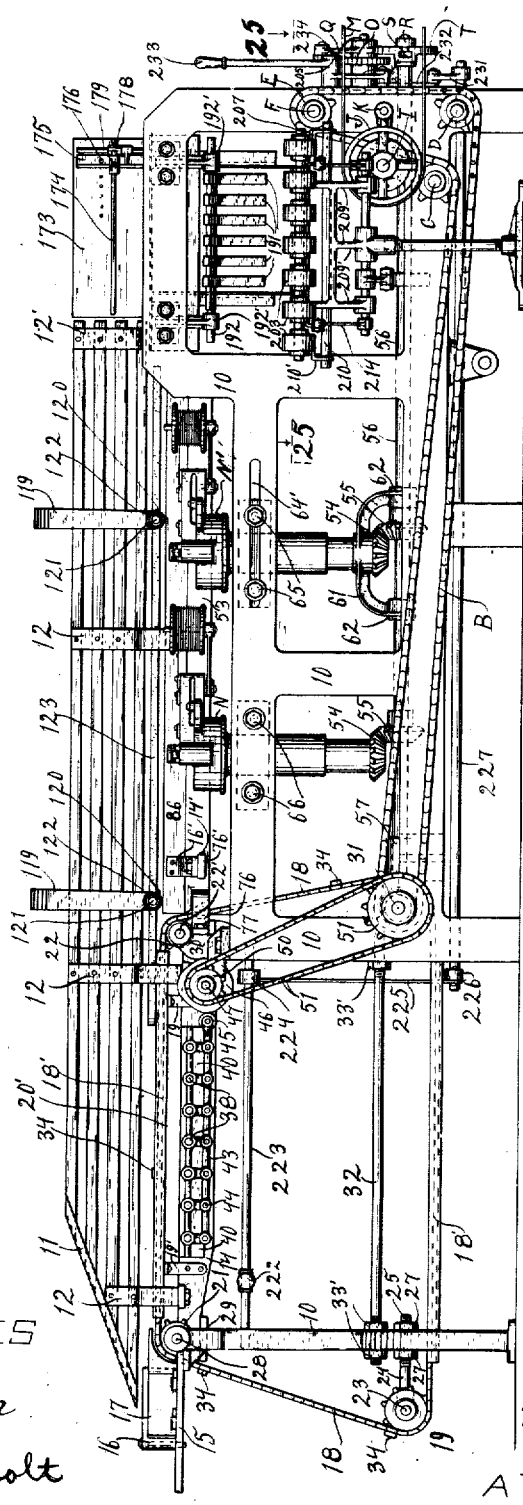

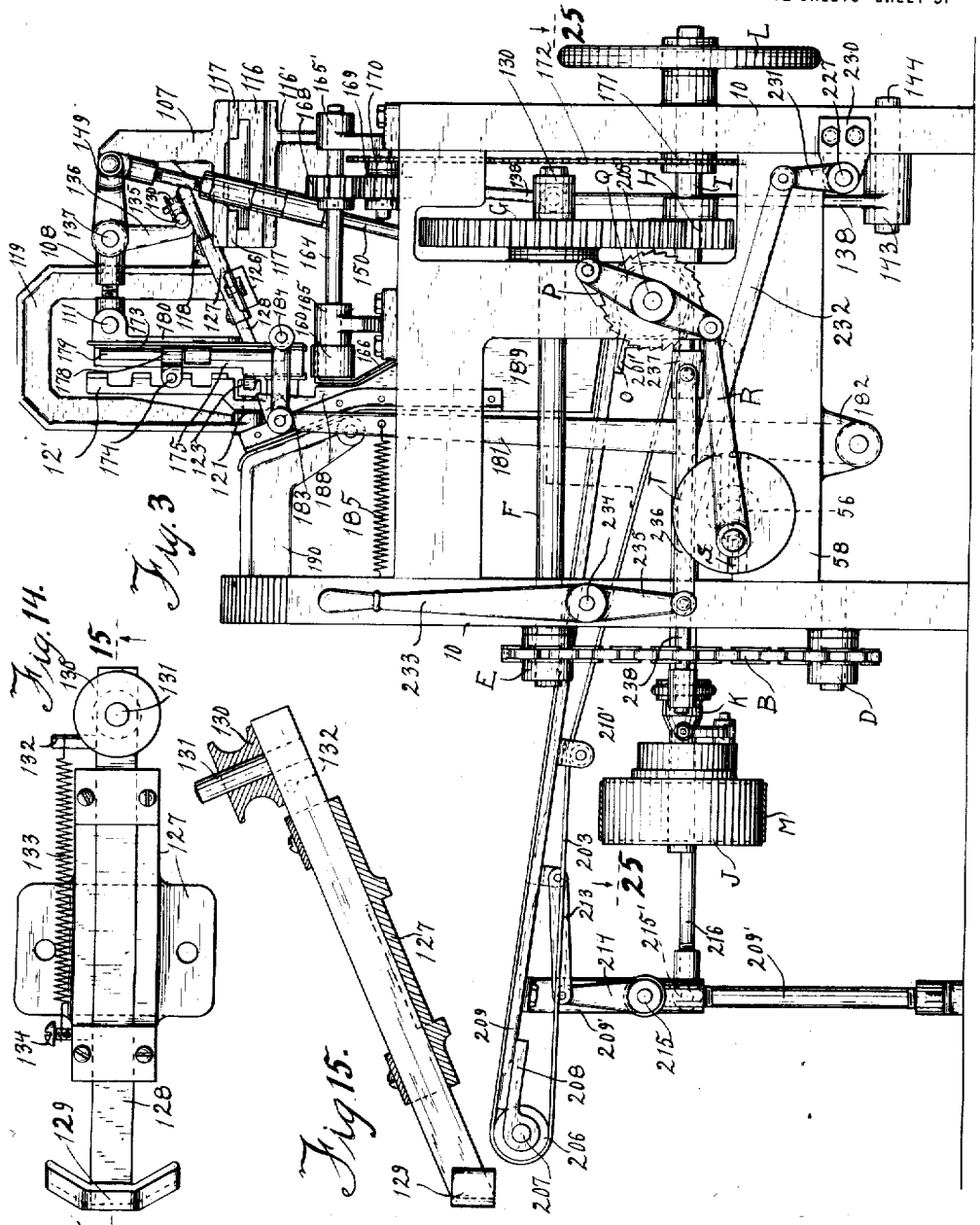

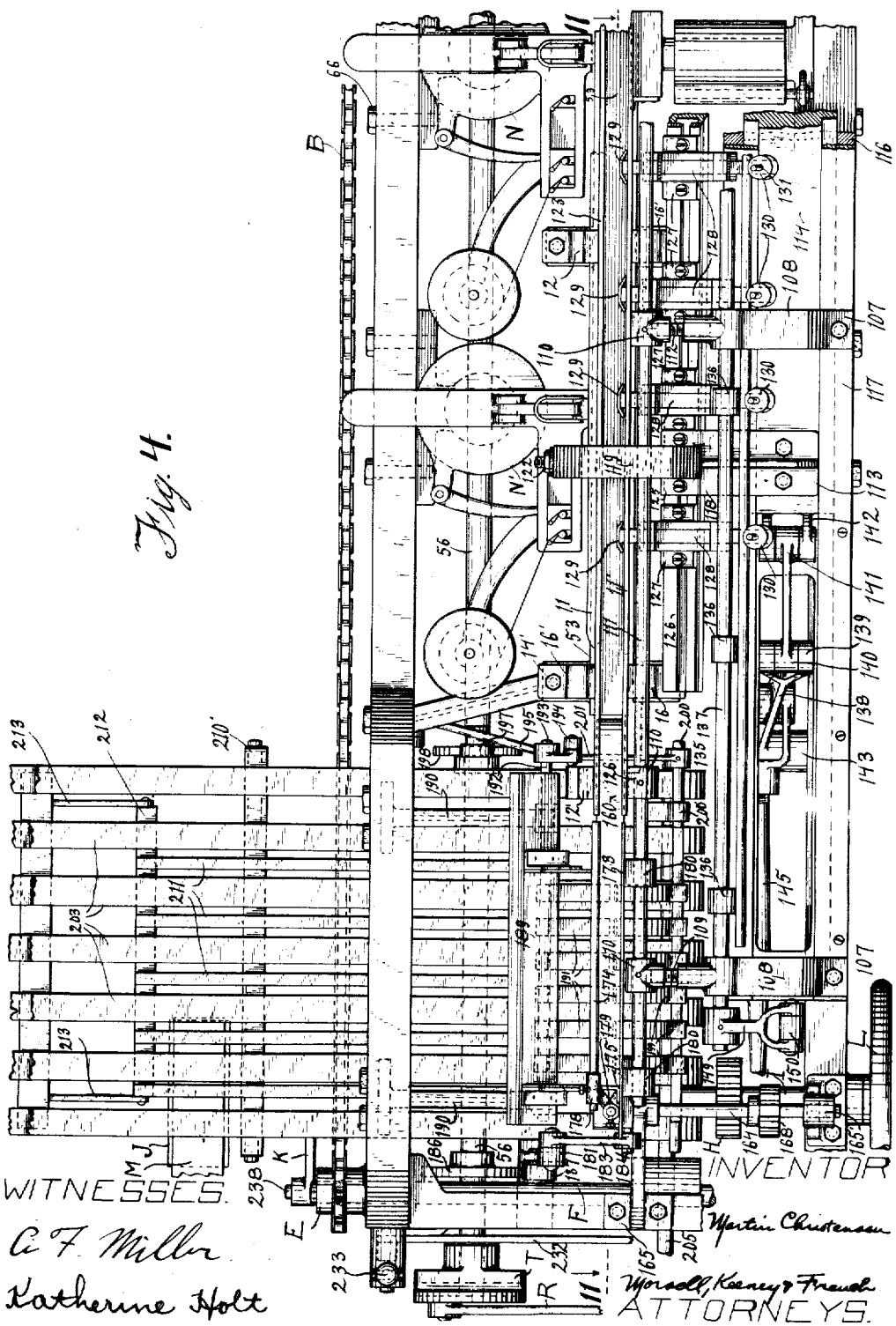

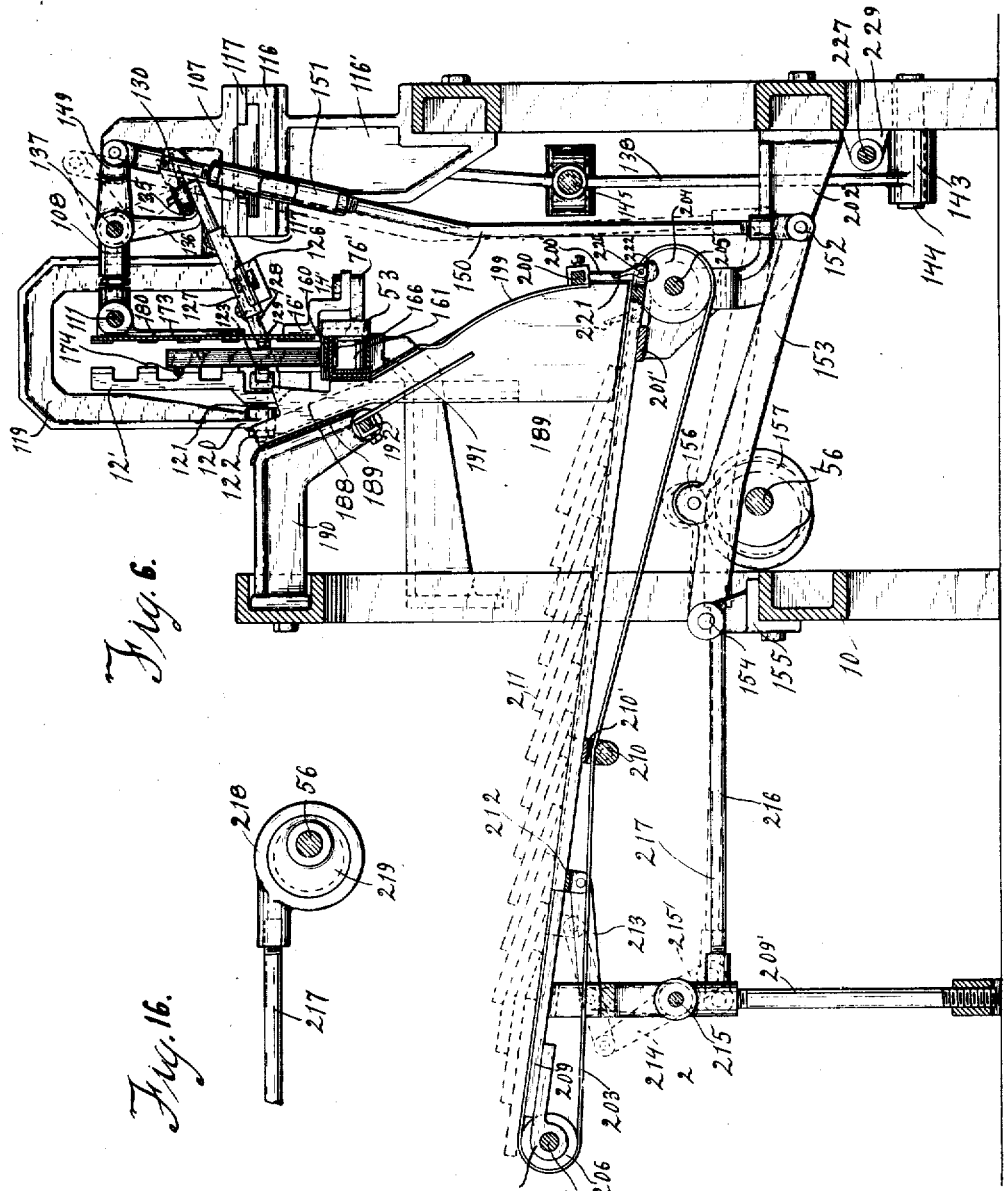

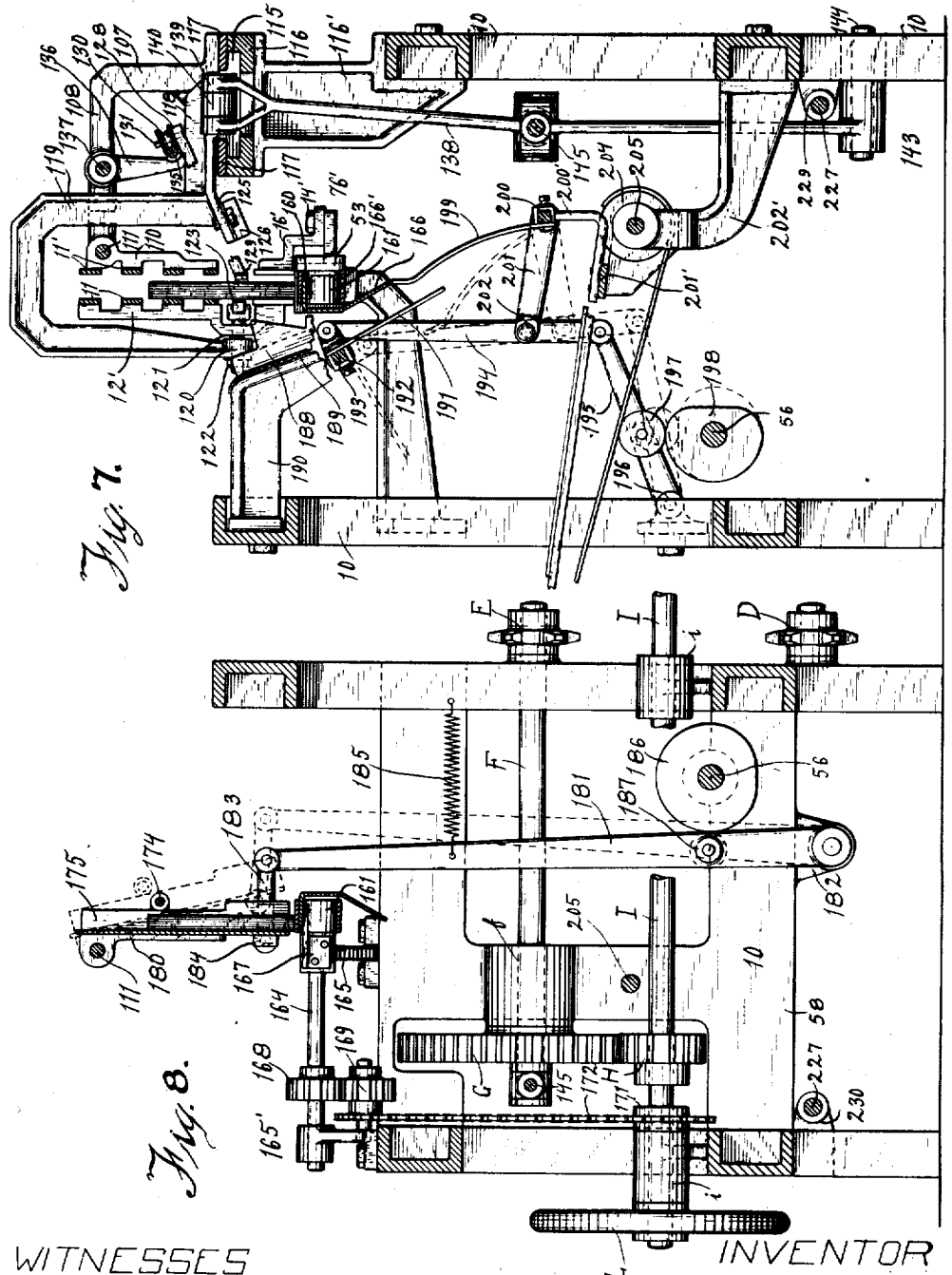

M. CHRISTENSEN.
BOOK STITCHING MACHINE.
APPLICATION FILED JUNE 6, 1914.
1,165,749.
Patented Dec. 28, 1915.
12 SHEETS—SHEET 8.
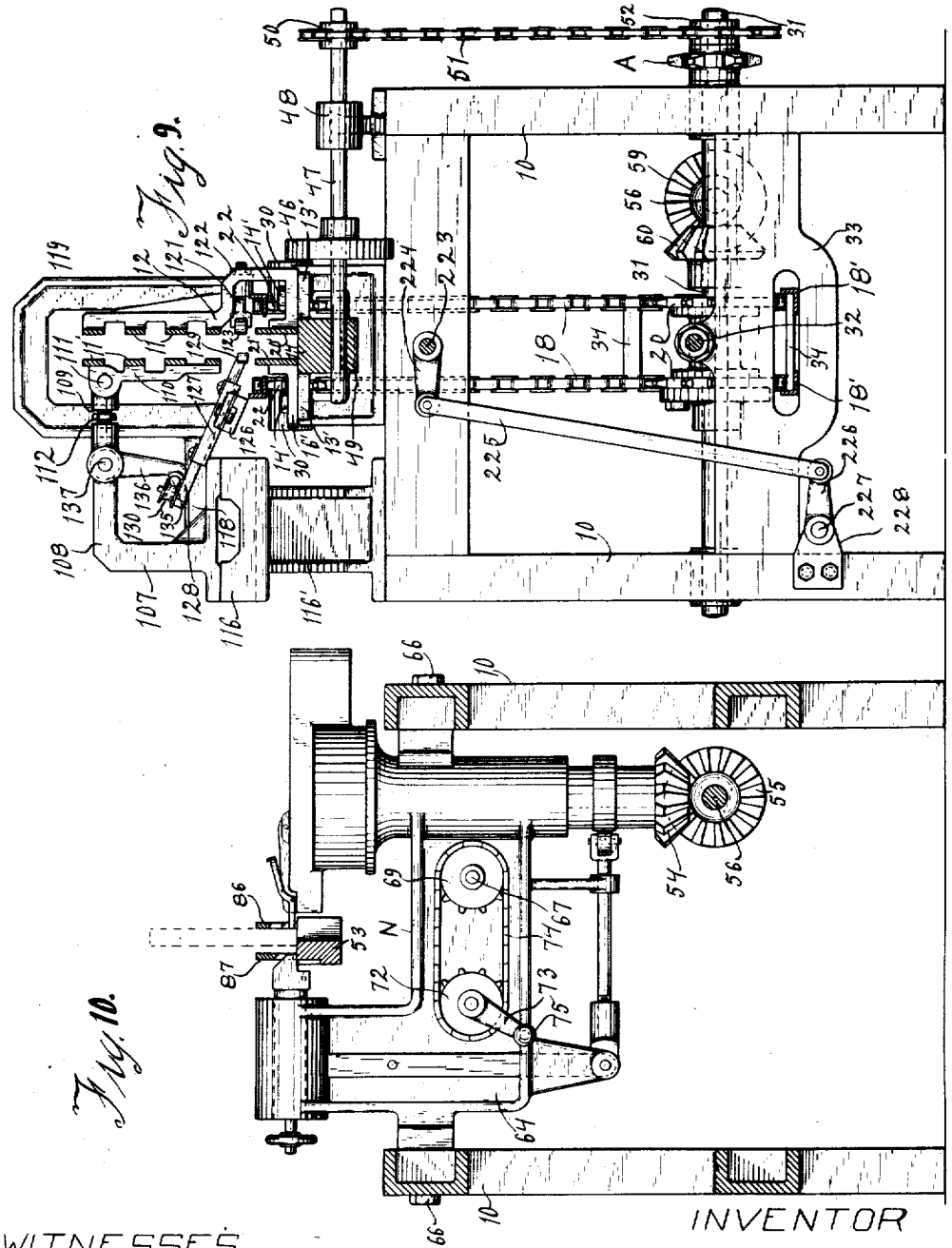
WITNESSES
INVENTOR
Martin Christensen
Morsell, Keeney & French
ATTORNEYS.

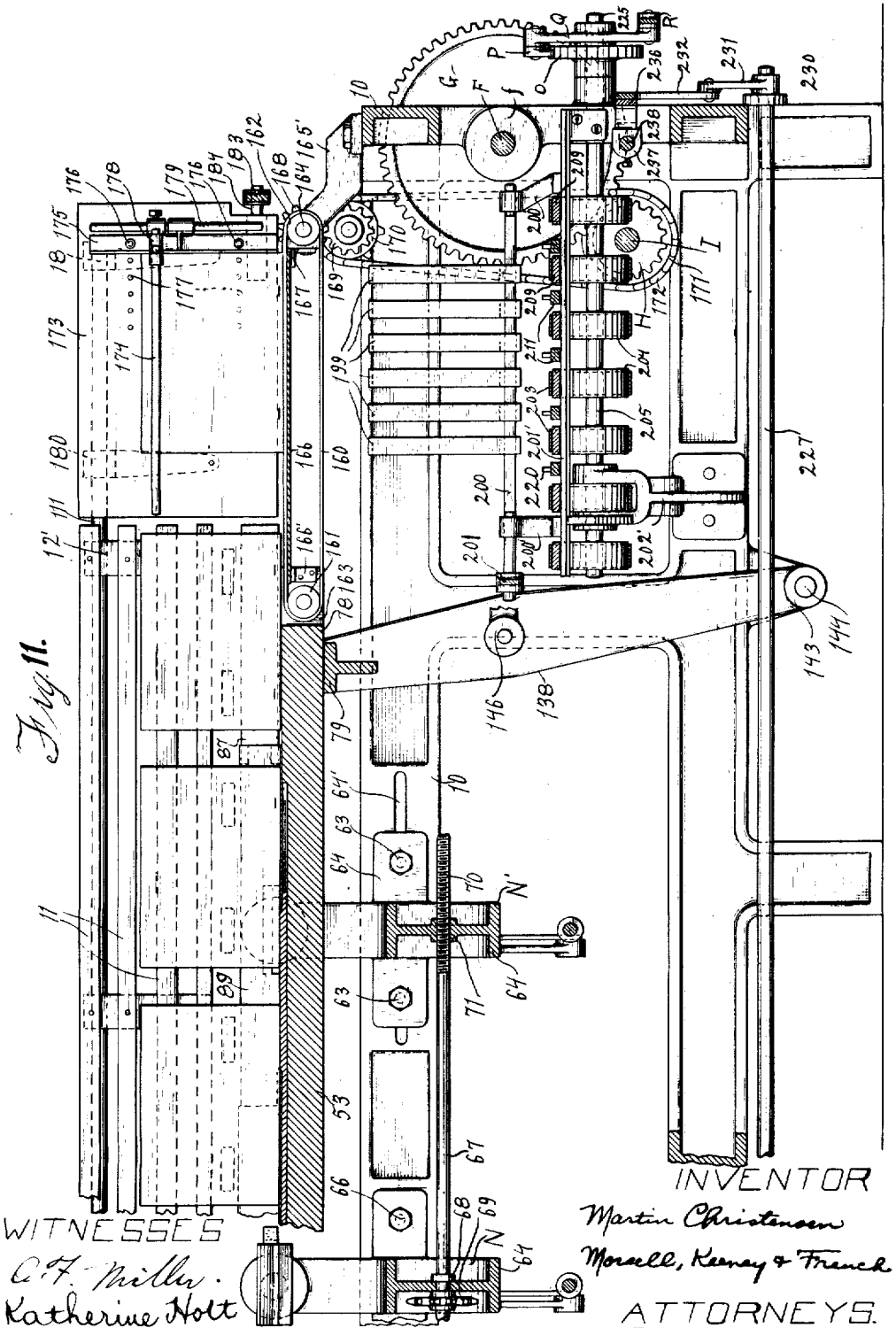

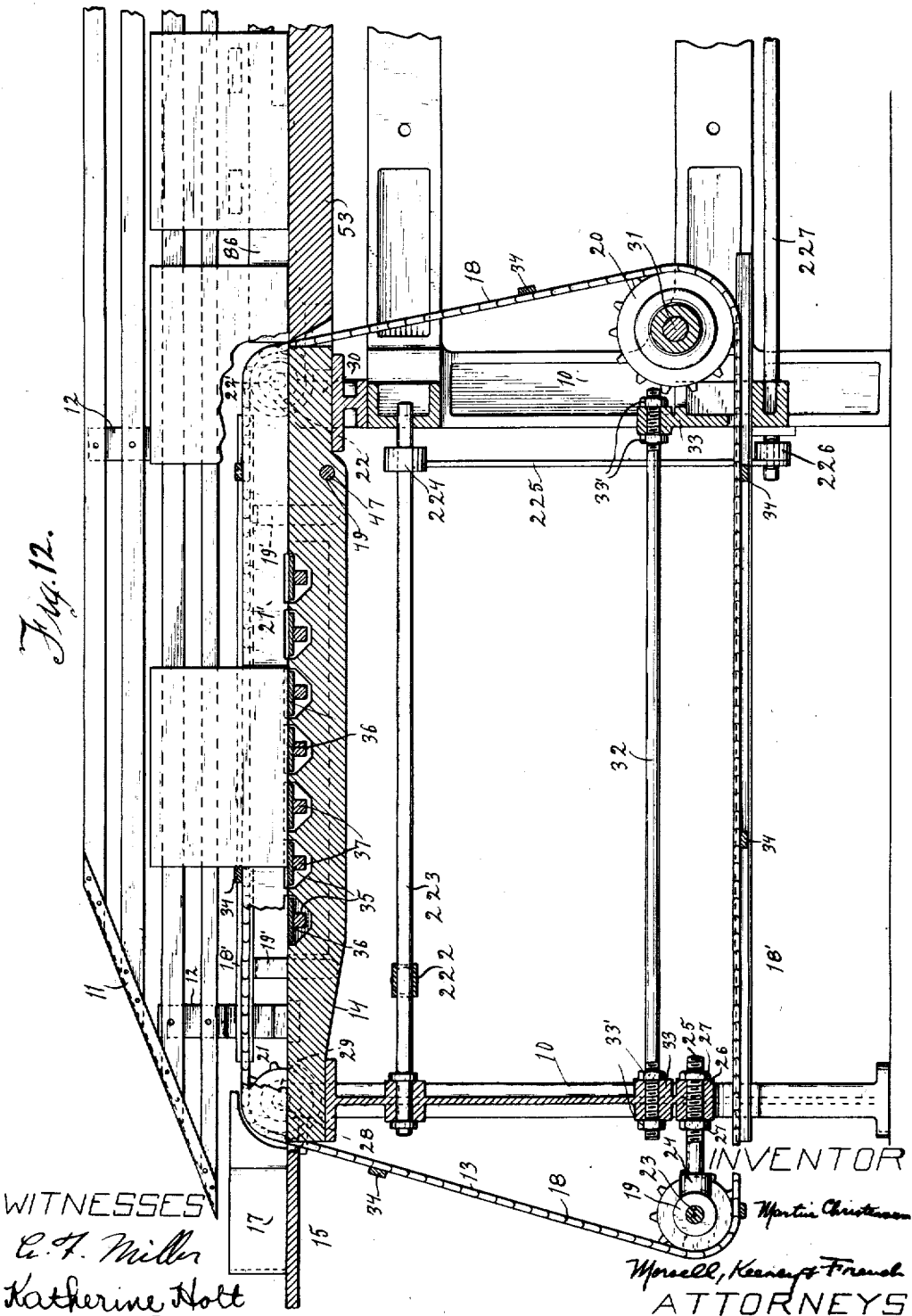

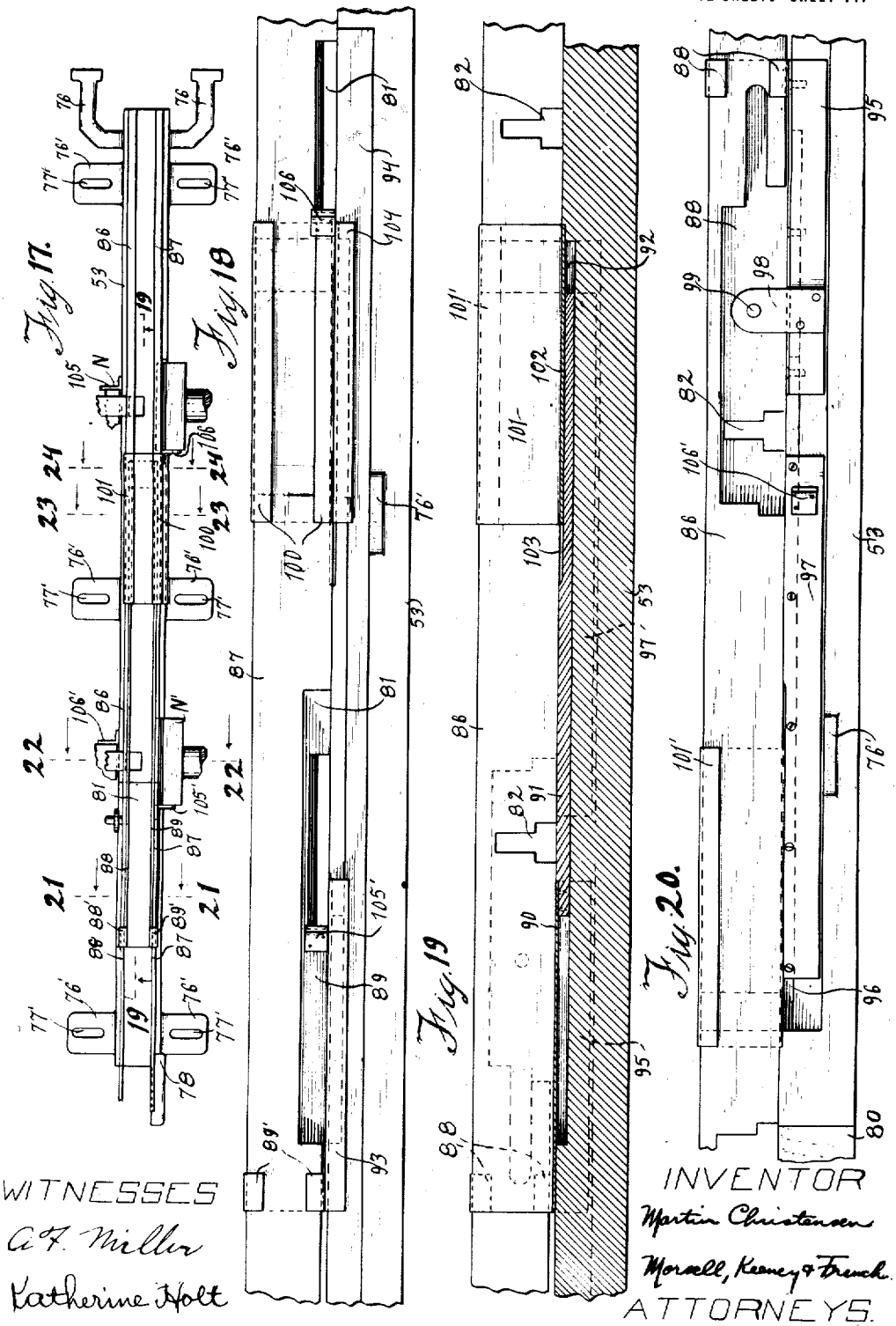

M. CHRISTENSEN.
BOOK STITCHING MACHINE.
APPLICATION FILED JUNE 6, 1914.

1,165,749.

Patented Dec. 28, 1915.
12 SHEETS—SHEET 12.

Fig. 25.

WITNESSES.
C. F. Miller
Katherine Holt

INVENTOR
Martin Christensen
Morsell, Kenny & French
ATTORNEYS.

UNITED STATES PATENT OFFICE.

MARTIN CHRISTENSEN, OF RACINE, WISCONSIN.

BOOK-STITCHING MACHINE.

1,165,749. Specification of Letters Patent. Patented Dec. 28, 1915.

Application filed June 6, 1914. Serial No. 843,347.

*To all whom it may concern:*

Be it known that I, MARTIN CHRISTENSEN, a citizen of Racine, in the county of Racine and State of Wisconsin, have invented new and useful Improvements in Book-Stitching Machines, of which the following is a description, reference being had to the accompanying drawings, which are a part of this specification.

The invention relates to bookbinding.

The invention designs to provide a machine comprising mechanism for alining the sheets of a book, pamphlet or magazine preparatory to binding or sewing it together, devices for binding or stitching the sheets of the book, mechanism for conveying the alined sheets to the binding devices, mechanism for feeding the book past the binding devices during the binding operation, mechanism for conveying the books away from the feed mechanism for the binding devices, and from the machine after they are bound.

The invention further designs to provide a bookbinding machine for binding books of different thicknesses and of varying sizes of sheets, the feeding and binding mechanisms of the machine being adjustable for this purpose.

The invention further designs to provide means for simultaneously operating all of the above enumerated mechanisms and devices.

The invention further designs to provide means at either end of the machine, for controlling the operation thereof.

The invention further designs to provide a new and improved form of bookbinding machine.

The invention consists in the several features hereinafter set forth, and more particularly defined by claims at the conclusion hereof.

In the drawings, Figure 1 is an elevation of one side of the device embodying the invention. Fig. 2 is an elevation of the other side thereof. Fig. 3 is an elevation of the rear end thereof. Fig. 4 is a top view of part of the machine showing the binding, conveying and delivery mechanisms. Fig. 5 is a top view of part of the machine, showing the conveyer and sheet alining mechanism (Figs. 4 and 5 constitute a plan view of the whole of the machine). Fig. 6 is a section taken on the line 6—6 of Fig. 1. Fig. 7 is a section taken on the line 7—7 of Fig. 1. Fig. 8 is a section taken on the line 8—8 of Fig. 1. Fig. 9 is a section taken on the line 9—9 of Fig. 1. Fig. 10 is a section taken on the line 10—10 of Fig. 1. Fig. 11 is a section taken on the line 11—11 of Fig. 4. Fig. 12 is a section taken on the line 12—12 of Fig. 5. Fig. 13 is a section taken on the line 13—13 of Fig. 1. Fig. 14 is a detail view of one of the elements of the intermittent feed mechanism. Fig. 15 is a section taken on the line 15—15 of Fig. 14. Fig. 16 is a detail view of one of the cams shown in Fig. 6. Fig. 17 is a plan view of the stitcher adjustment mechanism. Fig. 18 is an elevation of one side thereof. Fig. 19 is a section taken on the line 19—19 of Fig. 17. Fig. 20 is an elevation of the other side of the stitcher adjustment mechanism. Fig. 21 is a section taken on the line 21—21 of Fig. 17. Fig. 22 is a section taken on the line 22—22 of Fig. 17. Fig. 23 is a section taken on the line 23—23 of Fig. 17. Fig. 24 is a section taken on the line 24—24 of Fig. 17. Fig. 25 is a sectional view of the line 25—25 of Fig. 3, and 25—25 of Fig. 2.

The invention consists of a sheet alining device and operating mechanism therefor, a stitcher or binder, mechanism for feeding the books past the binding mechanism and operated conjointly therewith, mechanism for removing the books from the machine after they are bound, and mechanism for conveying the books from the feed mechanism to said book-removing mechanism, all of which are mounted on a suitable supporting frame 10.

We will consider first the device for alining the sheets which form the book. This consists of a pair of racks 11 and 11', to receive the sheets respectively arranged as to number therebetween, a conveyer 13 for carrying the sheets along between the racks, and a supporting table 14 upon which the sheets rest on edge while being carried along between the racks. A receiving apron 15 is secured to the frame 10 adjacent the racks 11 and 11', and is provided with inner guides 16 pivoted to the apron 15 and outer guides 17 adjustably secured on the apron, which permit sheets for two books to be positioned and successively fed to the machine.

The conveyer 13 consists of a pair of endless chains 18, each of which is mounted respectively on sprockets 19 and 20 secured to the lower part of the frame 10 and sprockets 21 and 22 suitably secured to the upper portion of the frame 10. The sprockets 19 are secured to shafts 23 journaled in forked members 24 having threaded ends 25 which are inserted in apertures 26 in the frame 10 and locked in position by nuts 27 abutting against either side of the frame. The sprockets 21 are mounted on a shaft 28 mounted in a suitable bearing 29 on the frame 10. The sprockets 22 are mounted on a shaft 22' journaled in brackets 30 secured to the upper portion of the frame 10. The sprockets 20 are mounted on a shaft 31 which is journaled in the sides of the frame 10, as shown in Fig. 9 and Fig. 12. The forks 24 which support the gears 19 may be adjusted with respect to the frame by means of the threaded ends 25 and the nuts 27, and thereby adjust the tension of the endless conveyer chains 18. A brace rod 32 is adjustably secured to cross bars 33 on the frame 10 by nuts 33'.

The endless chains 18, mounted on the sprockets as previously pointed out, are disposed parallel to each other, so as to provide a space therebetween (as shown in Fig. 9) and are connected together at different points along their length by blocks or strips 34 secured to the outer side of each of the chains, and the chain is so disposed above the supporting table 14 that the strips 34 are spaced therefrom as they move with the chain over the table. The chains 18 in their horizontally-extending stretches run in angled guides and guards 18', the lower guides being secured directly to the frame, the upper guides being secured to brackets 19' on the table 14. Adjustable side plates 20' and 21' are disposed between the chains and the table.

The supporting table 14 is provided with a series of transverse recesses 35, into which are placed a series of plates 36, each having a depending portion 37 rigidly secured to a shaft 38 journaled in bearings 39 on flange-plates 40 secured to the table 14 (see Fig. 13). Each of the shafts 38 is rigidly secured to one end of a rocker arm 41. The other end of the rocker arm 41 has a pin 42 secured therein, and all of the rocker arms are connected together for conjoint operation by a link member 43 having bearings 44 for receiving the pins 42 of the respective rocker arms 41 and a roller 45 at one end, to contact with the surface of a cam 46 to rock the plates 36 in unison within the recesses 35 of the table.

The cam 46 is mounted on a shaft 47 which is journaled in a bracket 48 secured to a transverse member of the frame 10 and in a bearing 49 in the supporting table 14, as shown in Figs. 9 and 12. The shaft 47 carries a sprocket 50 thereon, which is connected by a chain 51 with a sprocket 52 on the shaft 31, the shaft 31 thus serving to drive both the conveyer mechanism and the mechanism for rocking the plates 36.

The means for driving the shaft 31 comprises a gear or sprocket A mounted thereon and an endless chain B which passes around the sprocket A, thence rearwardly and over the idlers C and D at the rear end of the machine, and thence over the sprocket E (see Fig. 2). The sprocket E is mounted on one end of a shaft F which is journaled in bearings F' in the frame 10 (see Figs. 2, 3 and 8), which carries a gear G at the other end. The gear G meshes with a gear H on the main drive shaft I, which is journaled in bearings i on the frame, and has mounted thereon a main drive pulley J and a clutch K adjacent said pulley at one end, and a hand wheel L at the other. The pulley J is connected by a belt M to a suitable source of power, and when the clutch K is thrown in to drive the shaft I, the gear H meshing with the gear G will drive the shaft F and consequently the sprocket E, which will drive the endless chain B and consequently the shaft 31, which in turn, through the gears and connections previously described, will rotate the cam shaft 47 to operate the rocking mechanism on the supporting table, and also drive the endless chains 18 of the conveyer mechanism.

The operation of the sheet-alining device is as follows: The sheets of the book are arranged in consecutive order, upon the apron 15, between the guides 17 and 16, without regard to alinement, and are pushed forwardly on to the supporting table 14 until one of the strips 34 on the endless chains 18 engages the rear edges of the sheets as shown in Fig. 12. Under these conditions the sheets are carried along the supporting table 14 on edge between the racks 11 and 11', and over the plates 36 in the supporting table. During the progress of the sheets over these plates, the roller 45 coacting with the cam 46 moves the link 43 to rock the arms 41 on each of the shafts 38 carrying the plates 36, causing them to rock upwardly and in a direction opposite to the movement of the endless chains 18. In practice, the plates are actuated so quickly that a vibratory effect is produced on the sheets. Thus a force will be exerted on the lower edges of the sheets opposite to the force exerted on the side of the sheets adjacent the strip 34. Under these conditions, the pages will be moved up and down, and at the same time transversely against the strip 34 while they are being carried along between the racks 11 and 11', and this will result in alining the sheets preparatory to their being bound or sewed. After the sheets are alined, they are transported in an upright position by the chains 18, to a plate or supporting table 53 adjacent binding or stitching devices N and N'. The stitchers are conventionally shown in Fig. 10, but as the present invention does not contemplate any particular form of binding or stitching devices, they will not be described.

The invention so far as the stitchers or binders are concerned is more particularly confined to the means for adjusting one of the vertical stitching devices shown in Figs. 1, 2, 4, 10 and 11.

The vertical stitchers N and N' each carry a beveled gear 54 at the lower end thereof, which meshes with a beveled gear 55 on a shaft 56 which is journaled in a bracket 57 secured to the frame 10, as shown in Figs. 1 and 2, and which extends rearwardly therefrom to the rear end of the machine, being journaled on a transverse member 58 of the frame 10, as shown in Figs. 3 and 8. The shaft 56 adjacent the bearing 57 carries a beveled gear 59 (see Fig. 9) which meshes with a beveled gear 60 on the shaft 31 which, as we have previously pointed out, is driven from the main drive pulley J by the endless chain B. Thus the binding devices are driven and operate simultaneously with the sheet-alining mechanism, and are disposed adjacent the table 53 (see Fig. 10.) As the machine is designed to bind books and pamphlets of different lengths, it is necessary to provide an adjustment for one of the vertical stitchers, to accommodate for variation in the sizes of the books, and at the same time to provide a smooth guideway for the sides of the book. This adjustment involves not only an adjustment of the vertical binding devices, but also of supporting slides mounted on guides on the table adjacent the binding devices, and connected thereto, and means will now be described for accomplishing this purpose.

The binding device N' is provided at its lower end with a forked bracket 61, whose ends 62 are slidable upon the shaft 56, and the gear 55 which is keyed to the shaft being interposed between the arms 61 and adjacent one end 62, is free to move with it. The upper end of the adjustable vertical binding device N' is secured at either side to the frame 10 by bolts 63 which pass through slots 64' in the frame 10 (see Figs. 1 and 2), and are provided with lock nuts 65. The fixed binding device N is secured to the frame 10 by bolts 66. A shaft 67 is journaled to the supporting frame 64 of the fixed binding device N as shown in Figs. 10 and 11 being secured in position by a collar 68 and a sprocket 69 is mounted on said shaft adjacent the web of the frame 64. The other end of the rod or shaft 67 is threaded as shown at 70 in Fig. 11, and operates in the threaded aperture 71 of the frame 64 of the movable binder N'. A gear 72 journaled in the binder or stitcher N and operated by a crank 73 having a handle 75, is connected to the gear 69 by a chain 74 (see Fig. 10) and the turning of the handle 75 rotates the rod 67 to move the stitcher N' either toward or away from the stitcher N by means of the screw feed between the threaded end of the shaft and the threaded aperture 71 of the movable stitcher N'. This then constitutes the mechanism for adjusting one of the stitchers with respect to the other, but, as previously pointed out, supporting sides are connected to the stitcher and provide means for adjustably securing and positioning the upper end of the stitcher adjacent the guides and the table 53. The supporting table 53 is provided with forked arms 76 (see Fig. 17) bolted to the frame 10 at 77 (see Figs. 1 and 2) at its front end and secured at its rear end 78 to a transverse bar 79 (see Fig. 11). The table 53 is also provided with transverse lugs 76' having longitudinal slots 77' therein and a vertical slot 80 adjacent one side of the binder or stitcher N, and a longitudinally-extending slot 94 adjacent the other side of the binding devices or stitchers. A pair of guides 86 and 87 having slots 81 and 82 respectively are disposed in upright position upon the support 63 adjacent the slots 80 and 94 respectively in said support.

The means for adjusting and positioning the upper end of the stitcher N' adjacent the guides 86 and 87 and the supporting table 53, comprises movable slides 88 and 89 on the guides 86 and 87 respectively, which are provided with projecting guide tongues 88' and 89' at one end, said slides resting upon a plate 90 secured to a plate 91 in a recess 92 in the top of the support 53 (see Fig. 19) said plate 90 having a down-turned flange 93 fitting into a slot 94 in the support 53 adjacent the guide 87 and suitably secured at its other edge to a guide 95 (see Figs. 20 and 21), which guide fits within a recess or slot 96 in the side of the support 53. Another guide 97 similar to the guide 95 is secured to the plate 91 and fits within the slot 96. The guide 95 has a bracket 98 secured thereto, and a pin 99 passes through it and is secured to the slide 88 (see Figs. 20 and 22) so that longitudinal movement of the slide 88 will also cause a similar movement of the plates 90 and 91. The other end of the slides 88 and 89 fit into stationary guides 100 and 101. The guide 100 has projecting guide tongues 100' thereon, and the guide 101 has a similar tongue 101' and is bent at a right angle at its lower end to form a plate 102, which fits within a recess 103 on the top of plate 91 (see Fig. 19), and has a down-turned flange 104 adjacent the guide 87 (see Figs. 23 and 24). The fixed binder or stitcher N is secured by a bracket 105 to the guide 86 at one side and to the stationary guide 100 by a bracket 106 at the other side. The movable stitcher N' is secured at one side by a bracket 105' to the slides 89 and by a bracket 106' to the guide 97 at the other side.

It will be noted from the foregoing description that the slides 88 and 89 are free to move adjacent the guides 86 and 87 and within the guides 100 and 101, and that the pin 99 connects the guide 95 on the plate 91 to the slide 88. It will also be noted that the guides 95 and 97 and plate 90 are also connected to the plate 91; and therefore any longitudinal movement of the slides 88 and 89 will move the guides 95 and 97 and the plates 90 and 91. This longitudinal movement occurs when the adjustable stitcher N' is moved toward or away from the fixed stitcher N by the mechanism previously described, the sides of the stitcher being connected to the slide 89 and the guide 97 by the brackets 105' and 106' respectively. This construction thus provides means for guiding the upper end of the adjustable stitcher and for keeping it in proper position with respect to the guides, and for providing a smooth runway for the books.

As previously set forth, it is also necessary to adjust the machine for binding books of different thicknesses, so that the racks 11 which extend the whole length of the machine to the delivery end thereof, the plates or guides 20' and 21' on the alining device, and the guides 86 and 87 adjacent the stitchers, and the slides 88 and 89 connected to them, are provided with means for adjusting them with respect to each other, to vary the space therebetween.

The rack 11 having a binding strip 12' at its rear end is supported by brackets 12 adjacent the alining device and bent outwardly, to accommodate the feed chain 18 and inwardly, to abut the upright side guide 20' (see Fig. 9). The supporting table 14 has slotted lugs 13' similar to the lugs 76' on the supporting table 53 (see Fig. 17), and bolts 14' pass through the brackets 12 and are adjustably secured in the slotted lugs 13'. The upright guide 21' on the alining device is supported at the lower end of a bracket 15' similar to brackets 12, and a bracket 16 is adjustably secured by bolts 14' to the slotted lug 13' on the table 14. As the guides 20' and 21' are each secured to their respective brackets, and the brackets are adjustably secured to the supporting table 14, the guides may be moved in or out on the table to accommodate books of different thicknesses.

The guides 86 and 87 form a continuation of the upright guides 20' and 21' respectively, and they are supported on the table 53 by brackets 16' and 12 adjustably secured by bolts 14' in the slots 77' of the lugs 76' (see Figs. 4, 5 and 17), which permit the guides to be moved in and out on the table, to accommodate books of different thicknesses, and this is in no way hindered by the slides 88 and 89 and the brackets 100 and 101, as the slides 88 and 89 are free to move on the plates 90 and 91 (see Fig. 21), and the brackets 100 and 101 are free to move with respect to each other, the bracket 101 having its base 102 movable transversely in the recess 103 of the plate 91, and the bracket 100 resting upon the base 102 of the bracket 101 (see Figs. 23 and 24). The rack 11' having a binding strip 12' at its rear end, is mounted on the bracket 15' and brackets 107 secured to the frame 10, having arms 108 which have threaded apertures therein for receiving one end of studs 109, having a right and left handed thread, which carry bracket members 110 at their other end, to which the rack 11' is attached, each of the brackets being braced at the ends adjacent the rack 11' by a longitudinally-extending rod 111 passing through and rigidly secured to the members 110. The studs 109 may be adjusted by means of nuts 112 thereon, and resultantly the rack 11' will be adjusted with respect to the bracket 107, and consequently with respect to the supports 14 and 53 which are likewise secured to the frame 10. Thus the racks 11 and 11', guides 20' and 21', and guides 86 and 87, may be adjusted to accommodate books of different thicknesses.

Having described the binding devices and the means for guiding the books adjacent thereto, the means for intermittently moving the books in the guides past the stitchers, will now be considered.

The means for intermittently feeding the books past the binding devices comprises a plurality of brackets 113 secured at one end to a longitudinally-extending slide 114 slidably mounted within longitudinally-extending recesses 115 formed by plates 116 and 117 mounted upon one side of the frame 10 on supports 116'. The bracket 113 extends transversely from the slide 114 forming an arm 118, thence upwardly, forming a U-shaped arm 119, which passes over the racks 11 and 11' as shown in Figs. 3, 6, 7 and 9. The lower end 120 of the U-shaped bracket adjacent the rack 11, is threaded to receive one end of the threaded stud 121 having a nut 122, the other end of the stud carrying a longitudinally-extending bar 123 having substantially the function of a plurality of fingers disposed in a line with and parallel to the rack members 11, and by means of the threaded connection between the stud and the bracket the rod 123 may be adjusted with respect to said bracket, to accommodate different thicknesses of books. The arm 118 of the bracket 113 mounted at one end of the slide 114 is secured at its other end 125 to a recessed longitudinally-extending bar 126. This bar 126 carries a plurality of slides 127 adjustably secured in its recessed portion. The slides 127 each have pick-up fingers 128 slidably mounted thereon, having ends 129 for engaging with one of the sides of a book and carrying rollers 130 pivotally mounted on pins 131 at their other ends, and transverse pins 132 for receiving one end of springs 133 which are anchored at their other ends to the slides 127 by screws 134. The grooved rollers 130 are rotatably mounted for transitory movement upon a longitudinally-extending rod 135 secured to a plurality of levers 136, which levers are mounted on a longitudinally-extending rod 137 pivotally secured in the arms 108 of the brackets 107. The slides 127 carrying the fingers 128 are adjustable on the bar 126, so as to accommodate books of different sizes, and so that a pair of these members will simultaneously engage a book.

The slide 114 is operated by a slide mechanism comprising a lever 138 pivotally connected at one end 139 to a link 140 which is pivotally connected at its other end 141 to the forked end 142 of the slide 114. The other end 143 of the lever 138 carries a pin 144 which is pivotally mounted in the frame 10, thus serving to fulcrum the lever. A rod 145 is pivotally connected at one end 146 to the lever 138, and its other end 147 is adjustably and pivotally mounted in a slot 148 on the gear G. (See Figs. 1 and 2). As the brackets 113 which carry the bar 126 are secured to the slide 114, any movement of the slide in its guides through the operation of the slide mechanism, will likewise move the bar 126 and consequently the slides 127 carrying the fingers 128 back and forth, the rollers 130 on the upper ends of the fingers moving upon the rod 135.

The mechanism for causing the fingers 128 to engage or be released from a book, comprises a rod 137 having a link 149 secured thereto, which link is pivotally secured at its other end to a rod 150 which has a turnbuckle 151 for adjusting the length thereof. The lower end 152 of the rod 150 is pivotally secured to a lever 153 which is fulcrumed at 154 in a bracket 155 secured to the frame 10. (See Fig. 6). This lever 153 carries a roller 156 which engages the surface of the cam 157 mounted on the shaft 56. The cam 157 is designed to operate the lever 153 and consequently the rod 152, link 149 and shaft 137, to rock said shaft at predetermined intervals, thus causing the arms 136 secured thereto to move the rod 135 upwardly and downwardly, and consequently move the fingers 128 upwardly and downwardly in the slides 127, the rod 135 being operatively connected to the fingers 128 by the rollers 130, to cause said fingers to release or engage the sides of the book disposed adjacent to them. The springs 133 accentuate a downward gripping movement of the fingers.

The lever 138 and the rod 150 with the mechanisms for operating the same, are adapted to operate conjointly, the shaft 56 and the gear G being operatively connected through gears and driving connections previously pointed out.

The operation of the intermittent feeding mechanism is as follows: As the books are fed from the sheet alining device, the foremost pair of fingers 128 engages the foremost book on one side, pressing the book against the rod 123 on the other side under the action of the springs 133, and thus holding the book between the fingers and the guide rod, to move it along between the racks 11 and 11' and the guides 86 and 87. Then the fingers 128 which are mounted on the slides on the bar 126, which in turn is connected to the arm 118 of the bracket 113, and the rod 123 which is adjustably connected to the lower end 120 of the bracket 113, move forward a predetermined distance with the slide 114 which is operated, as previously pointed out, by the lever 138, rod 145 and gear G. After a brief stop, during which the binding device N binds or stitches the front end of the foremost book adjacent the lower edge thereof, the foremost book is released through the release of the fingers 128 by the operation of the rod 150 through the lever 153 and cam 157, which, as previously pointed out, rocks the rod 137 and consequently the lever arms 136, and, therefore, the rod 135, to move the fingers upwardly in the slides 127 against the action of the spring 133. Then the slide 114 moves rearwardly a distance equal to its forward movement, carrying the fingers 128 which are now in elevated position, and whose rollers 130 slide on the rod 135, so that the foremost pair of fingers is disposed adjacent the next book, and the second pair of fingers adjacent the foremost book. Under these conditions, the cam 157 rocks the shaft 137 to cause the levers 136 and the rod 135 to move downwardly, causing the downward movement of the fingers 128 in the slides, and their engagement with one side of the book and the engagement of the rod 123 with the other side thereof, as in the first instance. Then there is an interval, during which time the first and second books are moved forward and then the second book, which is now disposed adjacent the binding device N, is bound at its forward end, the binding device N being operated through the shaft 56, as previously pointed out. Then the fingers 128 release as before, and move back so that the foremost fingers may engage the third book, the second set of fingers engages the second, and the third set of fingers engages the first book. Then they grasp the books and move forward as before, carrying the books with them and disposing the third book adjacent the binding device N, which, during the brief stop, binds the forward end of the third book, the binding device N' binds the rear end of the foremost book, and after the release of the fingers 128 they again move back so that the foremost fingers engage the fourth book, and the next set of fingers engages the third book, the other sets of fingers engaging the second and first books respectively. (See Figs. 11 and 12). Then they move forward as before, during which operation the first book is carried forward to the delivery mechanism, and after the usual stop, during which the rear end of the second book is bound, and the forward end of the fourth book is bound, the fingers and the books are moved forward as before, bringing the next book in position to be carried away, by the delivery mechanism. Thus the operation of moving the books forward, binding or stitching the front and rear ends, and delivering them to the delivery mechanism, is repeated during the operation of the machine, but it is to be noted that the precise operation herein described need not be followed.

The feed mechanism may be adjusted for feeding a greater or less number of books past the binding mechanism to the delivery mechanism, the feed mechanism in the main being designed to feed the books so that they are disposed adjacent the stitchers for binding the front and rear ends of the lower edge of the books, after which they are carried to the delivery mechanism.

The delivery mechanism consists first of a delivery feed mechanism comprising an endless belt 160 running over the rollers or pulleys 161 and 162, the pulley 161 being journaled on a pin in the recessed end 163 of the table 53, and the pulley 162 being mounted on a shaft 164 journaled in brackets 165 and 165' on the frame 10. A plate 166 disposed beneath the upper run of the belt 160 is supported by brackets 166' and 167 secured to the table 53 and bracket 165 respectively. This plate extends over the front of the lower portion of the belt, and downwardly to form one side of the upper part of the delivery chute. The shaft 164 is operatively connected to the drive shaft I by a gear 168 on shaft 164, meshing with a gear 169 journaled in a shaft secured to the bracket 165', the gear 169 carrying a sprocket wheel 170 connected to a sprocket wheel 171 on the drive shaft I by a chain 172, which construction serves to drive the pulley 162, and consequently the endless belt 160.

The endless belt 160 carries the books away from the table 53, and moves each book into position between a guide plate 173 and a rod 174, the book being carried between these members until its front end rests against and is stopped by an angle plate 175, which is detachably secured to the plate 173 by bolts 176 which are adapted to be passed through any set of the parallel series of apertures 177 in the plate 173. The rod 174 is adjustably secured at one end to a bracket 178, which is slidably and detachably mounted on a rod 179 secured to the angle plate 175. Thus the rod 174 is secured and spaced away from the plate 173 and is adjustable with respect thereto. The plate 173 is pivotally mounted at its upper edge on the longitudinally-extending rod 111 by means of brackets 180 rigidly secured to the plate and pivotally secured to the rod, and means are provided for rocking the plate on the rod 111, and consequently the rod 174, to tilt these guide members so as to remove a book which is positioned therebetween from the endless belt. This means comprises a lever 181 pivoted at its lower end on a bracket 182 on the frame 10, and pivotally secured at its other end to a link 183 which operatively connects it with a pin 184 on the lower edge of the plate 173 forming a pivotal connection. The rod 181 is actuated to tilt the guide members 173 and 174, to remove the book therein from the endless belt, by means of a spring 185 secured to the frame and to the lever 181, whose operation is controlled by a cam 186 mounted on the shaft 56 and coöperating with a roller 187 pivotally mounted on the lever 181. When the cam 186 permits the spring 185 to tilt the guide members so that the book is removed from the belt, the book slides through the guides and into a delivery chute 188 which is formed by the plate 166 and guide plates 189 secured to brackets 190, on the frame 10.

It is necessary, when the book is removed from the machine, that it be delivered on its side, and it is desirable that the books so delivered overlap one another, and in this condition be carried away from the machine, and mechanism is provided for accomplishing this purpose. A movable plate is formed by a series of strips 191 disposed adjacent one side of the delivery chute, each being secured at one end to a shaft 192 journaled in brackets 192' and having a crank arm 193 thereon, which is pivotally secured to a lever 194 which, in turn, is pivotally secured to a lever 195 pivotally connected at its end 196 to a bracket in the frame 10. A roller 197 is pivotally mounted on the lever 195 and coacts with a cam 198 on the shaft 56 which is designed to move the lever 195, and consequently the lever 194, crank 193 and shaft 192, to rock said shaft and the plate 191.

A movable plate is formed by a series of strips 199 disposed adjacent the other side of the delivery chute, each being secured at their lower ends to a shaft 200 journaled in brackets 200' secured to the support 201' on the bracket 202' secured to the frame 10, which shaft has a crank 201 secured to it, and which crank is pivotally secured at its end 202 to the lever 194, so that any movement of the lever linkage of the strips 191 will produce a corresponding movement for the strips 199, and the strips are so operated that when a book moves down the delivery chute 188 and passes between the strips 191 and 199, the strips 191 move outwardly at the same time the strips 199 move outwardly, and the movement of the strips 199 against the book forces it over on its side, in which condition it falls down upon the mechanism for carrying the book away from the machine. These brackets 200' also serve as stops to limit the rearward movement of the books.

The mechanism for conveying the books away from the machine comprises a series of endless belts 203 mounted on pulleys or rollers 204, at one end, which are mounted on a shaft 205 journaled in the bracket 202' and in the frame 10 and rollers 206 at the other end, which are mounted on a shaft 207 journaled in brackets 208 secured to a latticed frame 209 over which the upper stretch of the belts 203 run, and which is supported by an adjustable support 209' at the front end and 201' at the rear end. A guide rod 210 is secured to a transverse support 210' disposed between the pulleys 206 and 204 over which the lower side of the belts run. The means for driving the belts comprises a toothed ratchet wheel O mounted on the shaft 205 which is engaged by a pawl P pivotally mounted at one end on a lever Q which is pivoted on the shaft 205, and the other end of the lever Q being pivotally connected to one end of a link R. The other end of the link R is adjustably and pivotally secured in the slot S on the disk T, which is secured to the shaft 56, and the rotation of the shaft would operate the levers R and Q to cause the pawl to engage the toothed wheel O to move the shaft 204 and consequently the pulleys 205, a part of a revolution and in proper timed relation with the plates which turn the books over, and thus by degrees successively carry the books along the belt and away from the machine in overlapped condition.

With the construction above described after a number of books have been overlapped and carried along by the belt, the frictional contact of the belt with the last deposited book is not sufficient to carry it along and consequently it drops down and the next book falls on it which of course results in impeding the action of the machine to obviate which I provide means which coöperates with the belts to positively insure the forward movement of each book upon the belts. These belts serve to carry the books which are now disposed on their sides, away from the machine; but, as previously pointed out, it is also desirable to have the books so disposed so as to positively insure the overlapping of successive books, and this is accomplished in the following manner: A series of slats 211 are secured to transverse members 212, and are disposed to move between the endless belts 203 and relatively thereto, the transverse member 212 being connected by links 213 to levers 214 mounted on a shaft 215 journaled in the adjustable supporting standard 209 which is spaced from the frame 10 and braced by a bar 216. The shaft 215 carries an arm 215' connected to one end of a rod 217 which is connected at its other end to an eccentric strap 218 on the eccentric 219 mounted on the shaft 56. A plurality of gravity-actuated pick-up fingers 220 are pivotally secured to the slats 211, and each having a projecting finger 221 and a weighted end 222. The shaft 56 rotates the eccentric 219 and consequently operates the linkage comprising the rods 217, 214 and 213 to move the slats backwardly and forwardly during the operation of the machine. The movable slats 211 and the fingers 220 coöperating with the endless belts 203 constitute the means for positively insuring the overlapping the books as they are successively delivered from the machine on their sides, the operation of which is as follows: The books pass down through the chute and are turned over on their sides, as previously pointed out. The first book being deposited on the belts 205 and on the slots 211 is engaged at its edge by the fingers 220 which, on the forward movement of the slats 211, pushes the book along on the belt a predetermined distance. The next book falling down, falls upon the fingers 220 which are then moved back on the backward movement of the rack 211 while the first book moves forwardly with the belts 203, and which assume an upright position as soon as they are released from the under side of the top book, in which position, on their forward movement, they engage the side of the top book and push it along a predetermined distance, and this operation is repeated so that the books which are disposed on their sides upon the belts 203 overlap one another, as shown in Fig. 6, and in this condition are carried over the frame 209 by the endless belts 203 away from the machine.

The means at either end of the machine for controlling the operation thereof, comprises a pair of operating handles, one handle 222 being secured to a rod 223 which is pivotally secured in upright members of the frame 10 (see Fig. 12), carrying a crank 224 to which one of a lever 225 is connected, the other end of the lever 225 being connected to a crank 226 which is secured to a longitudinally-extending control shaft 227 which is mounted in brackets 228, 229 and 230 on the frame 10. A crank 231 is secured at one end to the control shaft 227, and is pivotally secured at its other end to a link 232, which link is pivotally secured to an arm 235 of a control lever 233 at the rear end of the machine. The control lever 233 is pivoted to the frame 10 as at 234 in Fig. 3, and the arm 235 is pivotally connected to one end of a link 236, the other end of said link being pivotally connected to a sleeve 237 slidable on the clutch shaft 237', and to which a rod 238 is connected at one end, the other end of said rod being operatively connected to the clutch K for shifting the same, from which construction it follows that either of the control handles 222 at the front of the machine, and the control handle 233 at the rear thereof, will, through the linkage just described, operate the rod 238 to shift the clutch K in or out of operative connection with the drive pulley J to drive the shaft I.

The operation of the machine which has been described in detail in considering the different parts thereof, will now be described in brief. The machine is started by shifting either of the control handles 222 or 233, to throw in the clutch to operate the drive shaft I. The sheets of the books arranged in proper order are placed in the apron 15 so that they may be engaged by the strips 34 on the endless chains 18, after which they are successively carried over the supporting table 14, and during their progress there along are acted upon by the sheet alining device without stopping their progress to properly position the sheets preparatory to binding them together at the lower edge thereof. Then the books are carried along until they are engaged by the fingers 128 on the intermittent feed mechanism, which carry them along, disposing them adjacent the binding devices N and N', which bind the front and rear ends of the lower edges thereof, after which they are carried to the endless belt 160 on the delivery mechanism, and after entering the guides 173 and 174 they fall into the delivery chute 188 through the operation of the tilting mechanism for the guides 173 and 175, and during their progress through the delivery chute they are turned over on their sides by the conjoint operation of the strips 191 and 199, so that they are disposed flat on their sides upon the delivery mechanism, which also operates to dispose successive books so that they will overlap each other, in which condition they are moved forward upon the delivery mechanism and away from the machine.

The invention thus exemplifies a book-binding machine for alining the sheets which form the book, stitching or binding the sheets so alined at the lower edges thereof, to form a book conveying the books to the delivery mechanism, positioning them on their sides and overlapping one another, and in this condition carrying them away from the machine.

The invention is not to be restricted to the details of construction herein set forth, it being my intention to claim the invention as broadly as will be permitted by the state of the art.

I claim—

1. In a book-binding machine, the combination, with a support, of movable means over and upon which collected groups of signatures pass for alining them during their passage over said support without stopping their progress along said support.

2. In a book-binding machine, the combination, with a supporting table, of movable means disposed within said table and over and upon which collected groups of signatures pass for alining them during their progress over said table in upright position without stopping their progress along said table.

3. In a book-binding machine, the combination, with a plurality of book-binding devices, of a sheet-alining device comprising movable means over and upon which groups of sheets pass for alinement without stopping their progress toward the binding devices, and mechanism for conveying the sheets from the alining device to the binding devices.

4. In a book-binding machine, the combination, with a plurality of book-binding devices, of a sheet-alining device comprising movable means over and upon which groups of sheets pass for alinement of one of their edges without stopping their progress toward the binding devices, and mechanism for conveying the sheets from the alining device to the binding devices and away from the same after they are bound.

5. In a book-binding machine, the combination, with a plurality of book-binding devices, of a sheet-alining device comprising movable means over and upon which groups of sheets pass for alinement of one of their edges without stopping their progress toward the binding devices, and a mechanism for intermittently conveying the books from the alining device past the binding devices.

6. In a book-binding machine, the combination, with a supporting table and a plurality of book-binding devices, of mechanism for alining the sheets of a book during their progress over said table without stopping the progress of the sheets along said table comprising movable means over and upon which the groups of sheets pass, and means for conveying the sheets over said table from the sheet alining device to the binding devices.

7. A book-binding machine, comprising a supporting table, mechanism for alining the adjacent edges of the sheets of a book during their continuous progress over said table without stopping their progress along said table comprising movable means over and upon which the sheets pass and means for conveying the sheets over said movable means, book-binding devices, means for conveying the sheets from the alining device past said binding means, and means for delivering the book from the machine after it is bound.

8. A bookbinding machine comprising a supporting table, mechanism for alining the sheets of a book during their continuous progress along the supporting table without stopping the progress of the sheets along said table, means for binding the sheets to form a book, means for conveying the sheets from the alining device past said binding means during the binding operation, means for delivering the book from the machine after it is bound, and means for conveying the book from the binding-conveying means to the delivery means.

9. A bookbinding machine comprising a supporting table, mechanism for alining the sheets of books during their continuous progress along the supporting table without stopping the progress of the sheets along said table, means for binding the book, means for intermittently conveying the sheets to said binding means and away from the same, and means for delivering the book from the machine after it is bound.

10. A bookbinding machine comprising a supporting table, a device for alining the sheets of books during their continuous progress over said table without stopping the progress of the sheets along said table, a plurality of binders, means for conveying the sheets from said alining device to dispose them adjacent the binders, means for conveying them past the binders, and means for delivering the books from the machine after they are bound.

11. A bookbinding machine comprising a supporting table, a device for alining the sheets of the books during their progress over said table, a plurality of binders, means for conveying the books from said alining device to dispose them adjacent the binders, means 'for intermittently conveying them past the binders, and means for delivering them from the machine after they are bound.

12. In a bookbinding machine, the combination of a table, means for exerting a force against one of the edges of a group of signatures during their passage over said table, and means for exerting force against another of the edges of said signatures, said means coöperating to aline adjacent edges of said groups of signatures during their passage over said table without stopping their progress along said table.

13. A bookbinding machine comprising a sheet-alining device, a binder, means for conveying the books from the sheet-alining device to the binder, means for conveying the books past the binder, adjustable guides on said alining device and adjacent said binder, for the sides of the books, and means for conveying the books away from the machine after they are bound.

14. A bookbinding machine comprising a sheet-alining device, a binder, means for conveying the books from the sheet-alining device to the binder, means for conveying the books past the binder, adjustable guides and adjustable racks on said alining device and adjacent said binder for the sides of the books, and means for conveying the books away from the binder.

15. A bookbinding machine comprising a sheet-alining device, a binder, means for conveying the books from the sheet-alining device to the binder, means for conveying the books past the binder, adjustable guides on said alining device and adjacent said stitchers, adjustable racks for the sides of the books adjacent the upper edges thereof, and means for conveying the books away from the machine after they are bound.

16. In a book-binding machine, the combination, with a supporting table and mechanism for continuously feeding collected groups of signatures along said table, of means over and upon which said groups of signatures pass while they are being fed along said table for alining said groups without stopping their progress along said table.

17. In a book-binding machine, a sheet-alining device comprising a supporting table, mechanism for continuously feeding collected groups of signatures along said table, means over and upon which said groups of signatures pass during their passage along said table for alining adjacent edges of each of said groups without stopping their progress along said table, and means for simultaneously operating said feeding mechanism and signature-alining means.

18. In a book-binding machine, the combination of a supporting table, mechanism for successively conveying groups of signatures along said table, and means over and upon which said signatures pass coöperating with said feeding mechanism and conjointly operated therewith for alining adjacent edges of the signatures in each of said groups during their continuous passage along said table without stopping their progress along said table.

19. In a book-binding machine, the combination of a supporting table, mechanism for successively and continuously conveying groups of signatures along said table, and means over and upon which said signatures pass coöperating with said feeding mechanism and conjointly operated therewith for alining adjacent edges of the signatures in each of said groups of signatures during their progress along said table without stopping their progress along said table.

20. In a book-binding machine, the combination of a supporting table, a signature-alining device comprising mechanism for successively and continuously conveying groups of signatures along said table, means over which said signatures pass coöperating with said feeding mechanism for alining the groups of signatures during their continuous passage along said table without stopping their progress, book-binding devices, and means for intermittently feeding the signatures from the signature alining device past the binding devices.

21. In a bookbinding machine, the combination of a table, means disposed on said table for exerting a force against the lower edges of the sheets of a book, and means disposed above the table for exerting a force opposed to that of the means on the table, said means coöperating to aline the sheets of a book.

22. In a bookbinding machine, the combination of a supporting table, means disposed on said table for intermittently exerting a force against the lower edges of the sheets of the book, and means disposed above the table for continuously exerting a force on one of the sides of the sheets of the book opposed to that of the means on the table, said means coöperating to aline the sheets of a book.

23. In a bookbinding machine, the combination of a table, means disposed on said table for exerting a force against the lower edges of a plurality of sheets, means disposed above the table for exerting a force opposed to that of the means on the table, and means for conjointly operating both of said means for alining the sheets.

24. In a book-binding machine, the combintion of a supporting table, means for conveying collected groups of sheets along said table, and rocking means over and upon which said groups pass during their passage along said table for alining one of the edges of the sheets in each group without stopping their progress along said table.

25. In a book-binding machine, the combination of a supporting table, means for continuously conveying groups of signatures along said table, and rocking means over and upon which said groups pass during their passage along said table for alining said signatures without stopping their progress along said table.

26. In a book-binding machine, the combination of a supporting table, means for continuously conveying groups of signatures along said table, and rocking means over and upon which said signatures pass during their progress along said table coöperating with said conveying means for alining adjacent edges of the signatures in each group without stopping their progress along said table.

27. In a book-binding machine, the combination of a supporting table, means for conveying groups of signatures over said table, rocking means over and upon which said signatures pass during their passage along said table, and means for conjointly operating said conveying and rocking means for alining said signatures without stopping their progres along said table.

28. In a bookbinding machine, the combination of a supporting table, means for conveying the sheets constituting a book over said table, and a plurality of rocking plates on said table over which plates said sheets pass, said plates operating to aline said sheets.

29. In a bookbinding machine, the combination of a supporting table, means for conveying the sheets constituting a book over said table, a plurality of plates on said table over which plates said sheets pass, and means for conjointly operating said conveying means and rocking said plates for alining the sheets of the book.

30. In a bookbinding machine, the combination of a supporting table, an endless conveyer for carrying the sheets constituting a book over said table, a plurality of plates on said table over which plates said sheets pass, and means for simultaneously rocking said plates and driving said conveyer for alining the sheets of the book.

31. In a bookbinding machine, the combination of a supporting table, means for conveying the sheets constituting a book over said table, a plurality of plates on said table and transversely arranged with respect thereto, over which plates said sheets pass, and means for simultaneously rocking said plates and operating said conveyer for alining said sheets.

32. In a bookbinding machine, the combination of a supporting table, means for conveying the sheets constituting a book over said table, a plurality of plates on said table, rocker arms secured to said plates respectively, means comprising a cam for operating said rocker arms, and means for simultaneously operating said cam and conveying means for alining said sheets.

33. In a bookbinding machine, the combination of a supporting table, means for conveying the sheets constituting a book over said table, a plurality of endless chains spaced apart and having a plurality of transversely extending strips secured thereto, the sheets being disposed between said chains and against said strips, and means on the table coöperating with said conveyer-means for alining adjacent edges of the sheets forming each book while passing over said table.

34. In a bookbinding machine, the combination of a supporting table, means for conveying the sheets constituting a book over said table, a plurality of endless chains spaced apart and having a plurality of transversely extending strips secured thereto, the sheets being disposed between said chains and against said strips, rocking means on said table coöperating with said conveyer-means for alining said sheets, and means for simultaneously operating said conveying and rocking means.

35. In a book-binding machine, the combination of a supporting table, a signature-alining device comprising mechanism for successively and continuously conveying groups of signatures along said table and means on said table and over which said signatures pass coöperating with said feeding mechanism for alining the signatures in each group during their continuous passage along said table without stopping their progress, book-binding devices, means for intermittently feeding the groups of signatures from the alining device past the binders, and means for conjointly operating said alining and book-binding devices and said intermittent feeding mechanism.

36. In a book-binding machine, the combination of a supporting table, a signature-alining device comprising mechanism for continuously conveying successive groups of signatures over said table and means over and upon which said signatures pass coöperating with said feeding mechanism for alining the adjacent edges of the signatures in each group during their continuous passage over said table without stopping their progress along said table, means for binding the sheets of each group of signatures together to form a book, means for feeding the groups of signatures from the alining device past the binding means, means for delivering the books from the machine after they are bound, and means for simultaneously operating said alining device, feeding, binding and delivery means.

37. In a book-binding machine, the combination of a supporting table, means for conveying the sheets constituting a book over said table, a plurality of endless chains spaced apart and having a plurality of transversely extending strips spaced apart and secured thereto, the sheets being disposed between said chains and against said strips, means on the table coöperating with said conveyer-means for alining the adjacent edges of the sheets forming each book while passing over said table, and means for simultaneously operating said conveyer means and the means on said table.

38. In a bookbinding machine, the combination of a frame, a sheet-alining device on said frame, a plurality of separate devices for binding the sheets to form a book on said frame, means for adjusting one of said binding devices with respect to the other to vary the space therebetween, to stitch books of different sizes and to vary the number of stitches in each book, and means for conveying the books from said sheet-alining device past said binding devices.

39. In a bookbinding machine, the combination of a frame, a sheet-alining device on said frame, a plurality of separate devices for binding the sheets to form a book on said frame, means for adjusting one of said binding devices with respect to the other to vary the space therebetween, to stitch books of different sizes and to vary the number of stitches in each book, means for conveying the books from said sheet-alining device past said binding devices, and means for simultaneously operating said alining device, binding devices and conveying means.

40. In a bookbinding machine, the combination of a frame, a sheet-alining device on said frame, a plurality of separate devices for binding the sheets to form a book on said frame, means for adjusting one of said binding devices with respect to the other to vary the space therebetween, to stitch books of different sizes and to vary the number of stitches in each book, and means for intermittently conveying the books from said sheet-alining device past said stitchers.

41. In a book-binding machine, the combination of a supporting table, a plurality of devices adjacent said table for binding a plurality of sheets together to form a book, means for conveying the books along the table, and guide-means on the table for said sheets comprising guides and brackets secured to said guides and adjustably secured to said table.

42. In a bookbinding machine, the combination of a table, means for intermittently exerting force against one of the edges of a group of signatures during their passage over said table, and means for continuously exerting force against another of the edges of the signatures, said means coöperating to aline adjacent edges of the signatures in each group during their passage over said table without stopping their progress along said table.

43. In a book-binding machine, the combination of a sheet-alining device, power-operated stitchers for binding the sheets of a book, a support upon which said stitchers are mounted, means for adjusting one of said stitchers with respect to the other, means for conveying the sheets from said sheet-alining device past said binding devices, and adjustable means on said support for guiding a book while being operated upon by said stitchers.

44. In a bookbinding machine, the combination of a sheet-alining device, devices for binding the sheets of a book, a support upon which said devices are mounted, adjustable means on said support for guiding a book while being operated upon by said devices, means for adjusting one of said binding devices with respect to the other, and means on the adjustable guide means for guiding the adjustable binding device.

45. In a bookbinding machine, the combination of a sheet-alining device, devices for binding the sheets of a book, a support upon which said devices are mounted, adjustable means on said support for guiding a book while being operated upon by said devices comprising adjustable guides on the support, means for adjusting one of said binding devices with respect to the other, and guide means secured to the adjustable binding device and slidable on said guides.

46. In a book-binding machine, the combination of a supporting table, a sheet-alining device mounted thereon, devices adjacent said table for binding the sheets to form a book, and means for guiding a book during the binding operation comprising a plurality of brackets adjustably secured to said table, racks secured to said brackets for the sides of the book adjacent the upper edge thereof and guides secured to said brackets for the sides of the book adjacent the lower edge thereof.

47. In a bookbinding machine, the combination of a sheet-alining device, devices for binding the sheets of a book, a support upon which said devices are mounted, means for adjusting one of said binding devices with respect to the other, adjustable means on said support for guiding a book while being operated upon by said devices comprising adjustable guides for the sides of the book at the lower edge thereof, and adjustable racks for the sides of the book adjacent the upper edge thereof.

48. In a bookbinding machine, the combination of a sheet-alining device, devices for binding the sheets of a book, a support upon which said devices are mounted, means for adjusting one of said binding devices with respect to the other, adjustable means on said support for guiding a book while being operated upon by said devices comprising adjustable guides for the sides of the book at the lower edge thereof, adjustable racks for the sides of the book adjacent the upper edge thereof, and means on said adjustable guides for guiding the adjustable binding device.

49. In a bookbinding machine, the combination of a frame, a flat supporting table mounted on said frame, a plurality of devices mounted adjacent said table for binding together the sheets of a book, a plurality of fingers for engaging the sides of a book, and mechanisms for operating the fingers to carry books along said table in upright position and dispose them adjacent the binding devices.

50. In a bookbinding machine, the combination of a frame, a flat supporting table mounted on said frame, a plurality of devices mounted adjacent said table for binding a plurality of sheets to form a book, a plurality of fingers for engaging the books to carry them along said table in upright position and dispose them adjacent the binding devices, and means for releasing the fingers from the books after they are bound.

51. In a bookbinding machine, the combination of a frame, a flat supporting table mounted on said frame, a plurality of devices mounted adjacent said table for binding a plurality of sheets to form a book, a plurality of fingers for engaging the sides of the books, and mechanism for intermittently operating said fingers to carry the books along said table in upright position and dispose them adjacent the binding devices.

52. In a book-binding machine, the combination of a supporting table, a plurality of guides on said supporting table, a plurality of devices for binding a book disposed adjacent said table, and a plurality of fingers adapted to engage the sides of a book to carry it along the table in said guides and dispose it adjacent the binding devices.

53. In a book-binding machine, the combination of a supporting table, a plurality of guides on said supporting table, a plurality of devices for binding a book disposed adjacent said table, a plurality of fingers adapted to engage the sides of a book to carry it along the table in said guides and dispose it adjacent the stitchers, and mechanism for intermittently operating said fingers.

54. In a bookbinding machine, the combination of a flat supporting table, a plurality of bookbinding devices adjacent said table, a plurality of fingers adjacent one side of the table and adapted to engage one side of a book, and a longitudinally-extending rod adjacent one side of the table and for engaging the other side of said book, and means for moving said fingers and rod to carry a book held therebetween along the table in upright position, and dispose it adjacent said binding devices.

55. In a bookbinding device, the combination of a flat supporting table, a plurality of bookbinding devices adjacent said table, a plurality of fingers adjacent one side of the table and adapted to engage one side of a book, and a longitudinally-extending rod adjacent one side of the table and for engaging the other side of said book, and means for intermittently moving said fingers and rod to carry a book held therebetween along the table in upright position, and dispose it adjacent said binding devices.

56. In a bookbinding machine, the combination of a flat supporting table, a plurality of bookbinding devices adjacent said table, a plurality of fingers adjacent one side of the table and adapted to engage one side of a book, and a longitudinally-extending rod adjacent one side of the table and for engaging the other side of said book, means for moving said fingers and rod to carry a book held therebetween along the table in upright position and dispose it adjacent said binding devices, and to carry the books away from the binding device in upright position after they are bound.

57. In a bookbinding device, the combination of a flat supporting table, a plurality of bookbinding devices adjacent said table, a plurality of fingers adjacent one side of the table and adapted to engage one side of a book, and a longitudinally-extending rod adjacent one side of the table and for engaging the other side of said book, means for intermittently moving said fingers and rod to carry a book held therebetween along the table in upright position and dispose it adjacent said binding devices, and to carry the books away from the binding device after they are bound.

58. In a bookbinding machine, the combination of a flat supporting table, a plurality of bookbinding devices disposed adjacent said table for binding the sheets of a book during their progress over said table, and means for conveying said sheets over said table in upright position, comprising a plurality of releasable fingers adjacent one side of the table for engaging one side of a book, a longitudinally-extending rod adjacent the other side of the table for engaging the other side of said book, and means for moving said rod and fingers lengthwise of said frame.

59. In a bookbinding machine, the combination of a flat supporting table, a plurality of bookbinding devices disposed adjacent said table for binding the sheets of a book during their progress over said table, and means for conveying said sheets over said table in upright position, comprising a plurality of releasable fingers adjacent one side of the table for engaging one side of a book, a longitudinally-extending rod adjacent the other side of the table for engaging the other side of said book, and means for intermittently moving said rod and fingers lengthwise of said table.

60. In a bookbinding machine, the combination of a flat supporting table, a plurality of book-binding devices disposed adjacent said table for binding the sheets of a book during their progress over said table in upright position, means for conveying said sheets over said table, comprising a plurality of releasable fingers adjacent one side of the table for engaging one side of a book, a longitudinally-extending rod adjacent the other side of the table for engaging the other side of said book, and means comprising a slide mounted on said frame for moving said fingers and rod lengthwise of said table.

61. In a bookbinding machine, the combination of a flat supporting table, a plurality of bookbinding devices disposed adjacent said table for binding the sheets of a book during their progress over said table in upright position, means for conveying said sheets over said table, comprising a plurality of releasable fingers adjacent one side of the table for engaging one side of a book, a longitudinally-extending rod adjacent the other side of the table for engaging the other side of said book, and means comprising a slide mounted on said frame for moving said fingers and rod lengthwise of said table, and mechanism for intermittently operating said slide.

62. In a bookbinding machine, the combination of a supporting frame, a table mounted on said frame, a plurality of bookbinding devices for binding the sheets of a book during their progress over said table, means for conveying the books along said table comprising a slide, a plurality of brackets secured to said slide, a longitudinally-extending bar secured to said brackets, a longitudinally-extending rod secured to said brackets, a plurality of fingers operatively secured to said bar, means for operating the fingers to cause them to hold a book between them and the rod, and means for operating said slide to carry the books while engaged by the fingers over said table and past the stitchers.

63. In a bookbinding machine, the combination of a supporting frame, a table mounted on said frame, a plurality of bookbinding devices for binding the sheets of a book during their progress over said table, means for conveying the books along said table comprising a slide, a plurality of brackets secured to said slide, a longitudinally-extending bar secured to said brackets, a longitudinally-extending rod secured to said brackets, a plurality of fingers operatively secured to said bar, means for operating the fingers to cause them to hold a book between them and the rod, and means for intermittently operating said slide to carry the books while engaged by the fingers over said table and past the binding devices.

64. In a bookbinding machine, the combination of a frame, a table mounted on said frame, means for conveying the sheets forming a book from said table comprising a slide, a plurality of brackets secured to said slide, a longitudinally-extending bar secured to said brackets, a plurality of slides secured to said bar, a plurality of fingers disposed in said slides adapted to releasably engage one side of a book, and a longitudinally-extending rod adapted to engage the other side thereof, said bar being secured to the bracket on the slide, said bar and fingers coöperating to convey a book over the table.

65. In a bookbinding machine, the combination of a frame, a table mounted on said frame, means for conveying the sheets forming a book from said table comprising a slide, a plurality of brackets secured to said slide, a longitudinally-extending bar secured to said brackets, a plurality of fingers on said bar adapted to releasably engage one side of a book, and a longitudinally-extending rod adapted to engage the other side thereof, said bar being secured to the bracket on the slide, said bar and fingers coöperating to convey a book over the table.

66. In a bookbinding machine, the combination of a flat table, means for feeding the sheets constituting a book over said table, comprising a plurality of fingers adjacent one side of the table and adapted to engage one side of the book, a longitudinally-extending rod adjacent the other side of the table and adjacent said fingers, adapted to engage the other side of the book, mechanism for intermittently moving said fingers and rod lengthwise of said table to carry a book in upright position therealong, means for releasably securing said fingers to the book, and means for operating said finger-releasing means.

67. In a bookbinding machine, the combination of a flat table, means for feeding the sheets constituting a book over said table, comprising a plurality of fingers adjacent one side of the table and adapted to engage one side of the book, a longitudinally-extending rod adjacent the other side of the table and adjacent said fingers, adapted to engage the other side of the book, mechanism for intermittently moving said fingers and rod lengthwise of said table to carry a book in upright position therealong, means for releasably securing said fingers to the book, and means for operating said finger-releasing means.

68. In a bookbinding machine, the combination of a means for binding a plurality of sheets to form a book, means for intermittently conveying the books to and away from the binding means, means comprising a continuously moving conveyer to which the books are delivered by the intermittent conveyer, delivery mechanism, and means for removing the books from the continuously moving conveyer to the delivery mechanism.

69. In a bookbinding machine, the combination of means for binding a plurality of sheets to form a book, means for intermittently conveying the books to and away from the binding means, means comprising an endless belt to which the books are delivered by the intermittent conveyer, delivery mechanism, and means for removing the books from the endless belt, and discharging them onto the delivery mechanism.

70. In a bookbinding machine, the combination of means for binding books, means for intermittently conveying the books to and away from the binding means, means comprising a continuously moving conveyer to which the books are delivered by the intermittent conveyer, a delivery chute, mechanism for removing the box from the continuously moving conveyer to discharge them into the delivery chute, and mechanism for receiving the books from the delivery chute and conveying them away from the machine.

71. In a bookbinding machine, a delivery mechanism comprising guides, means for conveying books between said guides, a delivery chute, means for tilting the guides to remove the book from said conveying means and discharge it into the delivery chute, means disposed adjacent the delivery chute for turning the books over on their sides, and means for conveying the books away from the machine in this condition.

72. In a bookbinding machine, a delivery mechanism comprising a pair of guides, means for conveying a book between said guides, a delivery chute, means for tilting the guides to remove the book from said conveying means and discharge it into said chute, mechanism for overlapping successive books comprising means disposed adjacent the delivery chute for turning the book over on its side and means for conveying the books away from the machine in overlapped condition.

73. In a bookbinding machine, a delivery mechanism, comprising a pair of guides, means comprising an endless belt for conveying a book between said guides, a delivery chute, means for tilting the guides to remove the book from said belt and discharge it into the said chute, means disposed adjacent the delivery chute for turning the books over on their sides, and means for conveying the books away from the machine in this condition.

74. In a bookbinding machine, a delivery mechanism comprising a pair of guides, means comprising an endless belt for conveying a book between said guides, a delivery chute, means for tilting the guides to remove the book from said belt and discharge it into said chute, means disposed adjacent the delivery chute for turning the books over on their sides, and means comprising a plurality of endless belts for conveying the books away from the machine in overlapped condition.

75. In a bookbinding machine, a sheet-alining device comprising a supporting table, means for conveying the sheets over said table, in upright position, and means on the supporting table acting upon the bottom edges of the sheets, said means coöperating to aline the sheets of a book.

76. In a bookbinding machine, a sheet-alining device comprising a supporting table, means for conveying the sheets over said table, in upright position, and engaging one of the side edges of said sheets, and means on the supporting table acting upon the bottom edges of the sheets, said means coöperating to aline the sheets of a book.

77. In a bookbinding machine, a sheet alining device comprising a supporting table, means for conveying the sheets over said table in upright position, and reciprocating means disposed on said table for acting upon the bottom edges of said sheets, said means coöperating to aline the sheets of a book.

78. In a bookbinding machine, the combination of a supporting table, means for conveying sheets along said table, and vibrating means on the table for alining the sheets of a book without stopping the progress of said sheets along said table.

79. In a bookbinding machine, the combination of a supporting table, means for continuously conveying sheets along said table, and vibrating means on the table for alining the sheets of a book without stopping the progress of said sheets along said table.

80. In a bookbinding machine, the combination of a supporting table, means for continuously conveying sheets along said table, and vibrating means on the table coöperating with said book-conveyer for alining the sheets of a book without stopping the progress of said sheets along said table.

81. In a bookbinding machine, the combination of a supporting table, means for conveying sheets over said table, vibrating means on said table, and means for conjointly operating said conveying and vibrating means for alining the sheets of a book without stopping the progress of said sheets along said table.

82. In a book-binding machine, the combination of a supporting table, means for conveying sheets along said table, and oscillating means over which said sheets pass during their passage along said table for alining the sheets of a book without stopping their progress along said table.

83. In a book-binding machine, the combination of a supporting table, means for continuously conveying sheets along said table, and oscillating means over which said sheets pass during their passage along said table for alining said sheets without stopping their progress along said table.

84. In a book-binding machine, the combination of a supporting table, means for continuously conveying sheets along said table, and oscillating means over which said sheets pass during their passage along said table coöperating with said conveying means for alining said sheets without stopping their progress over said table.

85. In a book-binding machine, the combination of a supporting table, means for conveying sheets along said table, oscillating means over which said sheets pass during their passage along said table, and means for conjointly operating said conveying and oscillating means for alining said sheets without stopping their progress along said table.

86. In a bookbinding machine, a delivery mechanism including means for turning the books over on their sides, said means including movable plates for engaging the sides of a book and means for operating said plates.

87. In a bookbinding machine, a delivery mechanism including means for turning the books over on their sides, said means including movable plates for engaging the sides of each book, means for operating said plates, and means for conveying the books away in overlapped condition.

88. In a book-binding machine, the combination, with a support, of movable means for simultaneously exerting force against adjacent edges of groups of signatures to aline the signatures in each group during their passage along said support without stopping their progress.

89. In a book-binding machine, the combination of a frame, a supporting table mounted on the frame, a plurality of devices mounted adjacent said table for binding together the sheets of a book, a plurality of independently slidable fingers for engaging one side of a book, means for operating said fingers, means for engaging the other side of the book, and mechanism for moving said fingers and engaging means to carry the sheets along said table to dispose them adjacent the binding devices and to carry them away from said devices after they are bound.

90. In a bookbinding machine, the combination of a supporting table, a plurality of guides on said supporting table, a plurality of devices for binding a book disposed adjacent said table, a plurality of slidable fingers adapted to engage one side of a book, and means for engaging the other side of the book, said fingers and engaging means coöperating to carry it along the table in the said guides and dispose it adjacent the binding devices.

91. In a bookbinding machine, the combination of a supporting table, a plurality of guides on said supporting table, a plurality of devices for binding a book disposed adjacent said table, a plurality of slidable fingers adapted to engage one side of a book, means for engaging the other side of the book, said fingers and engaging means coöperating to carry it along the table in said guides and dispose it adjacent the stitchers, and mechanism for intermittently operating said fingers.

92. In a bookbinding machine, the combination of a supporting frame, a table mounted on said frame, a plurality of bookbinding devices for binding the sheets of a book during their progress over said table, means for conveying the books along said table comprising a slide, a plurality of brackets secured to said slide, a longitudinally-extending bar secured to said brackets, a plurality of slidable fingers secured to said bar, means for operating the fingers to cause them to hold a book between them and the rod, and means for operating said slide to carry the books while engaged by the fingers over said table and past the stitchers.

93. In a bookbinding machine, the combination of a supporting frame, a table mounted on said frame, a plurality of bookbinding devices for binding the sheets of a book during their progress over said table, means for conveying the books along said table, comprising a slide, a plurality of brackets secured to said slide, a longitudinally-extending bar secured to said brackets, a plurality of slidable fingers secured to said bar, a longitudinally extending rod, means for intermittently operating the fingers to cause them to hold a book between them and the rod, and means for intermittently operating said slide to carry the books while engaged by the fingers over said table and past the binding devices.

94. In a bookbinding machine, the combination of a frame, a table mounted on said frame, means for conveying the sheets forming a book from said table comprising a slide, a plurality of brackets secured to said slide, and a longitudinally-extending bar secured to said brackets, a plurality of slides secured to said bar, a plurality of slidable fingers disposed in said slides adapted to releasably engage one side of a book, and a longitudinally-extending rod adapted to engage the other side thereof, said bar being secured to the bracket on the slide, said bar and fingers coöperating to convey a book over the table.

95. In a bookbinding machine, the combination of a frame, a table mounted on said frame, means for conveying the sheets forming a book from said table comprising a slide, a plurality of brackets secured to said slide, a longitudinally-extending bar secured to said brackets, a plurality of slidable fingers on said bar adapted to releasably engage one side of a book, and a longitudinally-extending rod adapted to engage the other side thereof, said bar being secured to the bracket on the slide, said bar and fingers coöperating to convey a book over the table.

96. In a bookbinding machine, a delivery mechanism comprising means for turning the books over on their sides comprising movable plates for engaging the sides of each book, and means for conveying the books away from the machine in this condition.

97. In a book-binding machine, a delivery mechanism for delivering the books in overlapped condition comprising movable plates for engaging the sides of each book to turn it over on its side and means for conveying the books away from the machine.

98. In a bookbinding machine, a delivery mechanism comprising a conveyer, means for removing the books from the conveyer, means for turning the books over on their sides comprising movable plates for engaging the sides of each book, and means for conveying the books away from the machine in this condition.

99. In a book-binding machine, a delivery mechanism comprising a conveyer, means for removing the books from the conveyer, and mechanism for overlapping successive books comprising movable plates for engaging the sides of each book to turn it over on its side and means for conveying the books away from the machine.

100. In a bookbinding machine, a delivery mechanism comprising a delivery chute, movable means for discharging the books into said chute, means for engaging the sides of each book to turn it on its side after leaving the chute, and means for conveying the books away from the machine in this condition.

101. In a book-binding machine, a delivery mechanism comprising a delivery chute, means for discharging the books into said chute, and means for overlapping successive books comprising movable plates for engaging the sides of each book, and intermittently operated means for conveying the books away from the machine.

102. In a book-binding machine, the combination of means for binding books, means for delivering the books from the binding means, and mechanism for overlapping successive books comprising movable plates for engaging the sides of each book to turn it over on its side, and means for conveying the books away from the machine.

103. In a bookbinding machine, a delivery mechanism comprising a plurality of guides, means for adjusting said guides to different thicknesses and sizes of books, means for conveying books between said guides, a delivery chute, and means for tilting the guides to remove the book from said conveying means and discharge it into the delivery chute.

104. In a book-binding machine, a delivery mechanism comprising a pair of guides, means comprising an endless belt for conveying a book between said guides, a delivery chute, means for tilting the guides to remove the book from said belt and discharge it into said chute, and mechanism for overlapping successive books comprising means for turning the books over on their sides, and means for conveying the books away from the machine.

105. In a book-binding machine, a delivery mechanism comprising a pair of guides, an endless belt for conveying a book between said guides, a delivery chute, means for tilting the guides to remove the book from said belt and discharge it into said chute, and mechanism for overlapping successive books comprising means for turning the books over on their sides, and a plurality of endless belts for conveying the books away from the machine.

106. A bookbinding machine, comprising a sheet-alining device, a plurality of binding devices, means for conveying the sheets from the alining device past the stitchers, means for delivering the books from the machine, means for conjointly operating said above mentioned means and devices, and means at either end of the machine for controlling said operating means.

107. In a bookbinding machine, a delivery mechanism including means for turning the books over on their sides comprising movable plates for engaging the sides of each book and endless belts for conveying them away from the machine in this condition.

108. In a bookbinding machine, a delivery mechanism comprising means for turning the books over on their sides comprising movable plates for engaging the sides of each book, and intermittently operating endless belts for conveying them away from the machine in this condition.

109. In a book-binding machine, a delivery mechanism comprising movable plates for engaging the sides of each book to turn the books over on their sides, and endless belts for conveying them away from the machine, said plates and belts coöperating to deliver the books in overlapped condition.

110. In a book-binding machine, a delivery mechanism comprising movable plates for engaging the sides of each book to turn the books over on their sides, and intermittently operating endless belts for conveying them away from the machine, said plates and belts coöperating to deliver the books in overlapped condition.

111. In a bookbinding machine, a delivery mechanism comprising mechanism for overlapping successive books, including a reciprocating conveyer, means secured to said conveyer for engaging the book, and means for carrying the books away in overlapping condition.

112. In a bookbinding machine, a delivery mechanism comprising a conveyer, a reciprocating rack having a plurality of fingers secured thereto for engaging a book, and means for operating the rack to move the books carried thereby, a predetermined distance along the conveyer.

113. In a bookbinding machine, a delivery mechanism comprising means for overlapping successive books including a reciprocating conveyer, gravity actuated means on said conveyer for releasably engaging a book, and means for carrying the books away in overlapping condition.

114. In a bookbinding machine, a delivery mechanism comprising an intermittently moving conveyer, a rack, a plurality of gravity actuated fingers pivotally mounted on said rack for engaging a book, and means for reciprocating the rack to cause the fingers to move a book forward a predetermined distance along the conveyer, return beneath said book and move the next book forward in like manner.

115. In a bookbinding machine, the combination of a frame, a plurality of separate devices for binding the sheets to form a book, means for operating said devices comprising a power shaft, one of said devices being slidably mounted on said shaft and frame, and means for securing said slidably mounted device to the frame and to said shaft.

116. In a bookbinding machine, the combination of a frame, a plurality of separate devices for binding the sheets to form a book mounted upon the frame, means for slidably securing one of said devices to the frame, and means connected to said devices for moving said slidable binding device toward or away from the other binding device.

117. In a bookbinding machine, the combination of a frame, a binding device fixedly secured to the frame, a binding device movably secured to the frame, means for operating said devices comprising a power shaft, means for slidably mounting said movable binding device upon said shaft, and means connected to said fixed and movable binding devices for moving said movable binding device away from or toward the fixed binding device.

118. In a bookbinding machine, the combination of a supporting frame, a table mounted on said frame, means for conveying the books along said table comprising a slide, a plurality of brackets secured to said slide, a longitudinally extending bar secured to said brackets, means for releasably engaging one side of the book comprising a plurality of fingers slidably secured to said bar, a longitudinally extending rod slidably connected to said fingers and means for operating said rod to release the fingers from engagement with one side of the books, means for engaging the other side of the books, and means for moving said slide and the means for engaging the other side of the book.

119. In a bookbinding machine, the combination of a supporting frame, a table mounted on said frame, means for conveying the books along said table comprising a frame slidably mounted on the supporting table, a plurality of fingers slidably mounted on said slidable frame, means for operating the fingers to cause them to releasably engage one side of the books, and means secured to the slidable frame for engaging the other side of the books.

120. In a bookbinding machine, the combination of a supporting table, a sheet alining device mounted thereon, a plurality of devices adjacent said table for binding a plurality of sheets together to form a book, means for conveying the books along said table past the alining device and the binding devices, and guide means on the table for said sheets comprising guides and brackets secured to said guides and adjustably secured to said table.

121. In a bookbinding machine, the combination of a frame, a table mounted thereon, a binding device fixedly secured to the frame, a binding device movably secured to the frame, means for operating said devices, means for guiding the sheets along said table during the binding operation, and means for slidably securing the movable binding device to said guide means.

122. In a bookbinding machine, the combination of a frame, a table mounted thereon, a binding device fixedly secured to said frame, a binding device movably secured to said frame, guides on said table for guiding the sheets therealong during the binding operation, and guide means slidably mounted on said guides and operatively connected to said movable binding device.

123. In a bookbinding machine, the combination of a frame, a table mounted thereon, a binding device fixedly secured to said frame, a binding device movably secured to said frame, guides on said table for guiding the sheets therealong during the binding operation, and telescoping guide means mounted on said guides and connected to said movable binding device.

124. In a bookbinding machine, the combination of a frame, a table mounted thereon, a binding device fixedly secured to said frame, a binding device movably secured to said frame, book guides slidably mounted on said table, supplemental guides slidably mounted on said slidable guides and movable therewith and connected to said movable binding device.

125. In a bookbinding machine, the combination of a frame, a table mounted thereon, a binding device fixedly secured to said frame, a binding device movably secured to said frame, a plate slidably mounted in said table, book guides slidably mounted on said table and plate, supplemental guides slidably mounted upon said slidable guides and movable therewith and connected to said plate and to the movable binding device.

126. In a bookbinding machine, the combination of a frame, a table mounted thereon, a binding device fixedly secured to said frame, a binding device movably secured to said frame, a plate slidably mounted in said table, book-guides slidably movable across said table and plate, means for securing said guides in position, a supplemental guide movable with one of said book-guides and movable with respect to said guide, a supplemental guide movable with the other of said book-guides and movable with respect to this guide and having a portion slidably movable across said plate, and means for operatively connecting said plate and both supplemental guides to the movable binding device.

127. In a book-binding machine, the combination of a frame, a plurality of separate power operated stitchers for binding the sheets to form a book, means for operating said stitchers comprising a power shaft, one of said stitchers being slidably mounted on the frame and said shaft, and means for securing said slidably mounted stitcher upon said frame and shaft.

128. In a bookbinding machine, the combination of a supporting table, a plurality of bookbinding devices disposed adjacent said table for binding the sheets of a book during their passage over said table, and means for conveying said sheets over said table comprising a plurality of slidably reciprocating fingers for engaging one side of a book, means comprising a plurality of springs for operating said fingers, means for engaging the other side of the book, and means for moving said fingers and engaging means lengthwise of said table.

129. In a bookbinding machine, the combination of a supporting table, a plurality of bookbinding devices disposed adjacent said table for binding the sheets of a book during their passage over said table, and means for conveying said sheets over said table comprising a plurality of slidably reciprocating fingers for engaging one side of a book, a plurality of springs for moving said fingers into engagement with the book, oscillating means for moving said fingers out of engagement with the book, a longitudinally extending rod for engaging the other side of the book, and means for moving said fingers and rod lengthwise of said table.

130. In a bookbinding machine, the combination of a supporting table, a plurality of bookbinding devices disposed adjacent said table for binding the sheets of a book during their progress over said table, and means for conveying said sheets over said table comprising a reciprocating slide mounted on said table, a plurality of reciprocating fingers slidably mounted on said slide for engaging one side of a book, means for operating said fingers, a longitudinally extending rod for engaging the other side of the book, and mechanism for moving said slide, fingers and rod to carry the sheets along said table to dispose them adjacent the binding devices and to carry them away from said devices after they are bound.

131. In a bookbinding machine, the combination of a supporting table, a plurality of bookbinding devices disposed adjacent said table for binding the sheets of a book during their progress over said table, and means for conveying said sheets over said table comprising a reciprocating slide mounted on said table, a plurality of reciprocating fingers slidably mounted on said slide to engage one side of a book, means for operating said fingers, a longitudinally extending rod for engaging the other side of the book and mechanism for moving said slide, fingers and rod to carry the sheets along said table to dispose them adjacent the binding devices and to carry them away from said devices after they are bound.

132. In a bookbinding machine, a delivery mechanism comprising mechanism for overlapping successive books comprising means for turning each of the books over on its side, means for conveying the books away from the machine in overlapped condition, and auxiliary means coöperating with the conveying means to positively insure the overlapping of the books.

In testimony whereof, I affix my signature, in presence of two witnesses.

MARTIN CHRISTENSEN.

Witnesses:
JOHN T. WENTWORTH,
A. F. MILTON.

DISCLAIMER.

1,165,749.—*Martin Christensen*, Racine, Wis. BOOK-STITCHING MACHINE. Patent dated December 28, 1915. Disclaimer filed December 8, 1916, by the patentee.

Enters his disclaimer—

"To claims 1, 2, 3, 4, 5, 6, 7, 8, 9, 10, 11, 12, 16, 17, 18, 19, 20, 21, 22, 23, 33, 35, 37, 42, 75, 76, and 88."

[*Official Gazette, December 19, 1916.*]